United States Patent
Sato

(10) Patent No.: US 10,185,591 B2
(45) Date of Patent: Jan. 22, 2019

(54) INFORMATION PROCESSING APPARATUS SCHEDULING JOB START TIME

(71) Applicant: FUJITSU LIMITED, Kawasaki-shi, Kanagawa (JP)

(72) Inventor: Takaya Sato, Numazu (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 94 days.

(21) Appl. No.: 15/183,086

(22) Filed: Jun. 15, 2016

(65) Prior Publication Data

US 2017/0010918 A1 Jan. 12, 2017

(30) Foreign Application Priority Data

Jul. 6, 2015 (JP) ................................. 2015-134895

(51) Int. Cl.
  *G06F 9/50* (2006.01)
  *G06F 9/48* (2006.01)
  *G06F 9/46* (2006.01)

(52) U.S. Cl.
  CPC .......... *G06F 9/5038* (2013.01); *G06F 9/4881* (2013.01); *G06F 9/5027* (2013.01)

(58) Field of Classification Search
  None
  See application file for complete search history.

(56) References Cited

U.S. PATENT DOCUMENTS

| 2002/0194248 | A1* | 12/2002 | Wood | G06F 9/5038 718/102 |
|---|---|---|---|---|
| 2005/0033731 | A1 | 2/2005 | Lesh et al. | |
| 2006/0179438 | A1 | 8/2006 | Jackson | |
| 2010/0122255 | A1 | 5/2010 | Druyan et al. | |
| 2013/0047164 | A1 | 2/2013 | Ujibashi | |

(Continued)

FOREIGN PATENT DOCUMENTS

| JP | 2005-056421 | 3/2005 |
|---|---|---|
| JP | 2012-173753 | 9/2012 |
| JP | 2012-215933 | 11/2012 |

(Continued)

OTHER PUBLICATIONS

Extended European Search Report dated Dec. 2, 2016 in European Application No. 16174662.3.

(Continued)

*Primary Examiner* — Eric C Wai
(74) *Attorney, Agent, or Firm* — Staas & Halsey LLP

(57) ABSTRACT

An information processing apparatus including: a memory to store information of time zones available for each of a plurality of computation nodes; and a processor configured to execute a process including, obtaining a first time at which a job having the highest priority among a plurality of jobs is able to be executed, and in a case where a second time, which is later than the first time and is a candidate for an execution start time of the job having the highest priority, and from which more jobs are able to be executed in a predetermined time range than a case of executing the job having the highest priority from the first time, is present, allocating the plurality of jobs to the plurality of computation nodes such that the job having the highest priority and one or more other jobs are executed from the second time.

9 Claims, 34 Drawing Sheets

(56) References Cited

U.S. PATENT DOCUMENTS

2013/0152089 A1    6/2013  Shimamura

FOREIGN PATENT DOCUMENTS

| | | |
|---|---|---|
| JP | 2013-041529 | 2/2013 |
| WO | 2012/020474 A1 | 2/2012 |

OTHER PUBLICATIONS

Jacek Blazewicz et al., "Scheduling Multiprocessor Tasks to Minimize Schedule Length", IEEE Translations on Computers, vol. c-35, No. 5, May 1986, pp. 389-393.
Paul P. Ignatius et al., "Optimal scheduling of independent jobs in multiprocessor systems", Microprocessing and Microprogramming, Elsevier Science Publishers, BV., Amsterdam, NL, vol. 40, No. 9, Nov. 1994, pp. 651-672.

* cited by examiner

FIG. 7

| ALLOCATION WAITING JOB INFORMATION | | | 111 |
|---|---|---|---|
| JOB ID | REQUESTED RESOURCE AMOUNT | RESOURCE USE TIME | |
| A | 2 | tA | |
| B | 1 | tB | |
| C | 1 | tC | |
| D | 1 | tD | |
| ... | ... | ... | |

FIG. 8

EXAMPLE OF STRUCTURE OF ALLOCATION TARGET JOB INFORMATION
                                                                    121
```
1  struct schedjobinfo {
2      unit32_t num_jobs;        //NUMBER OF JOB INFORMATION
3      struct jobinfo *head_p;   //POINTER TO HEAD JOB INFORMATION
4      struct jobinfo *tail_p;   //POINTER TO TAIL JOB INFORMATION
5  };
```

EXAMPLE OF STRUCTURE OF SUBSEQUENT TARGET JOB INFORMATION
                                                                    122
```
1  struct jobinfo {
2      struct jobinfo *next_p;   //POINTER TO NEXT JOB INFORMATION
3      jid_t jid;                //JOB ID
4      unit32_t num_reqnids;     //REQUESTED RESOURCE AMOUNT
5      struct timespec reqtime;  //RESOURCE USE TIME
6  };
```

FIG. 10

EXAMPLE OF STRUCTURE OF AVAILABLE RESOURCE MANAGEMENT INFORMATION — 131

```
1  struct availrschead {
2      struct availrsc *head_p;    //POINTER TO HEAD AVAILABLE RESOURCE INFORMATION
3  };
```

EXAMPLE OF STRUCTURE OF AVAILABLE RESOURCE INFORMATION — 132

```
1  struct availrsc {
2      struct availrsc *next_p;         //POINTER TO NEXT ELEMENT
3      struct timespec time;            //TIME OF AVAILABLE RESOURCE
4      unit32_t num_rsc;                //NUMBER OF RESOURCE INFORMATION
5      struct availrscinfo *arihead_p;  //POINTER TO HEAD RESOURCE INFORMATION
6      struct availrscinfo *aritail_p;  //POINTER TO TAIL RESOURCE INFORMATION
7  };
```

EXAMPLE OF STRUCTURE OF RESOURCE INFORMATION — 133

```
1  struct availrscinfo {
2      struct availrscinfo *next_p;     //POINTER TO NEXT RESOURCE INFORMATION
3      struct availrscinfo *prev_p;     //POINTER TO PREVIOUS RESOURCE INFORMATION
4      struct timespec availtime;       //AVAILABLE TIME FOR COMPUTING RESOURCE
5      unit32_t num_nids;               //NUMBER OF AVAILABLE NODES
6      nid_t *nids_p;                   //AVAILABLE NODE ID
7      struct allocrscinfo allocinfo;   //TEMPORARY ALLOCATION WORK AREA
8  };
```

EXAMPLE OF STRUCTURE OF TEMPORARY ALLOCATION WORK INFORMATION — 134

```
1  struct allocrscinfo {
2      unit32_t total_alloc_nids;  //TOTAL NUMBER OF TEMPORARY ALLOCATION NODES
3      unit32_t num_ajs;           //NUMBER OF TEMPORARY ALLOCATION JOB INFORMATION
4      struct allocrscinfo *aj_p;  //POINTER TO HEAD TEMPORARY ALLOCATION JOB INFORMATION
5  };
```

EXAMPLE OF STRUCTURE OF TEMPORARY ALLOCATION JOB INFORMATION — 135

```
1  struct allocrscjobinfo {
2      struct allocrscjobinfo *next_p;  //POINTER TO NEXT ELEMENT
3      jid_t jid;                       //JOB ID
4      unit32_t num_alloc_nids;         //NUMBER OF ACQUIRED RESOURCES
5  };
```

FIG. 14

EXAMPLE OF STRUCTURE OF TEMPORARY ALLOCATION MANAGEMENT INFORMATION 136

```
1  struct joballocsummaryhead {
2      unit32_t num_joballocsum;     //NUMBER OF TEMPORARY ALLOCATION INFORMATION
3      struct joballocsummary *head_p;  //POINTER TO HEAD TEMPORARY ALLOCATION INFORMATION
4  };
```

EXAMPLE OF STRUCTURE OF TEMPORARY ALLOCATION INFORMATION 137

```
1  struct joballocsummary {
2      struct joballocsummary *next_p;  //POINTER TO NEXT ELEMENT
3      unit32_t num_jids;               //NUMBER OF ALLOCATED JOBS
4      struct timespec alloc_start;     //ALLOCATION START TIME
5      struct timespec alloc_end;       //ALLOCATION END TIME
6      struct joballoc *head_p;         //POINTER TO HEAD JOB ALLOCATION INFORMATION
7      struct availrsc *ar_p;           //AVAILABLE RESOURCE INFORMATION
8  };
```

EXAMPLE OF STRUCTURE OF JOB ALLOCATION INFORMATION 138

```
1  struct joballoc {
2      struct joballoc *next_p;         //POINTER TO NEXT JOB ALLOCATION INFORMATION
3      jid_t jid;                       //JOB ID
4      struct joballocrscinfo ari;      //JOB ALLOCATION RESOURCE INFORMATION
5  };
```

EXAMPLE OF STRUCTURE OF JOB ALLOCATION RESOURCE INFORMATION 139

```
1  struct joballocrscinfo {
2      struct timespec start;           //RESOURCE ALLOCATION START TIME
3      struct timespec end;             //RESOURCE ALLOCATION END TIME
4      unit32_t num_nids;               //NUMBER OF ALLOCATION RESOURCES
5      nid_t *nids_p;                   //ALLOCATION NODE ID
6  };
```

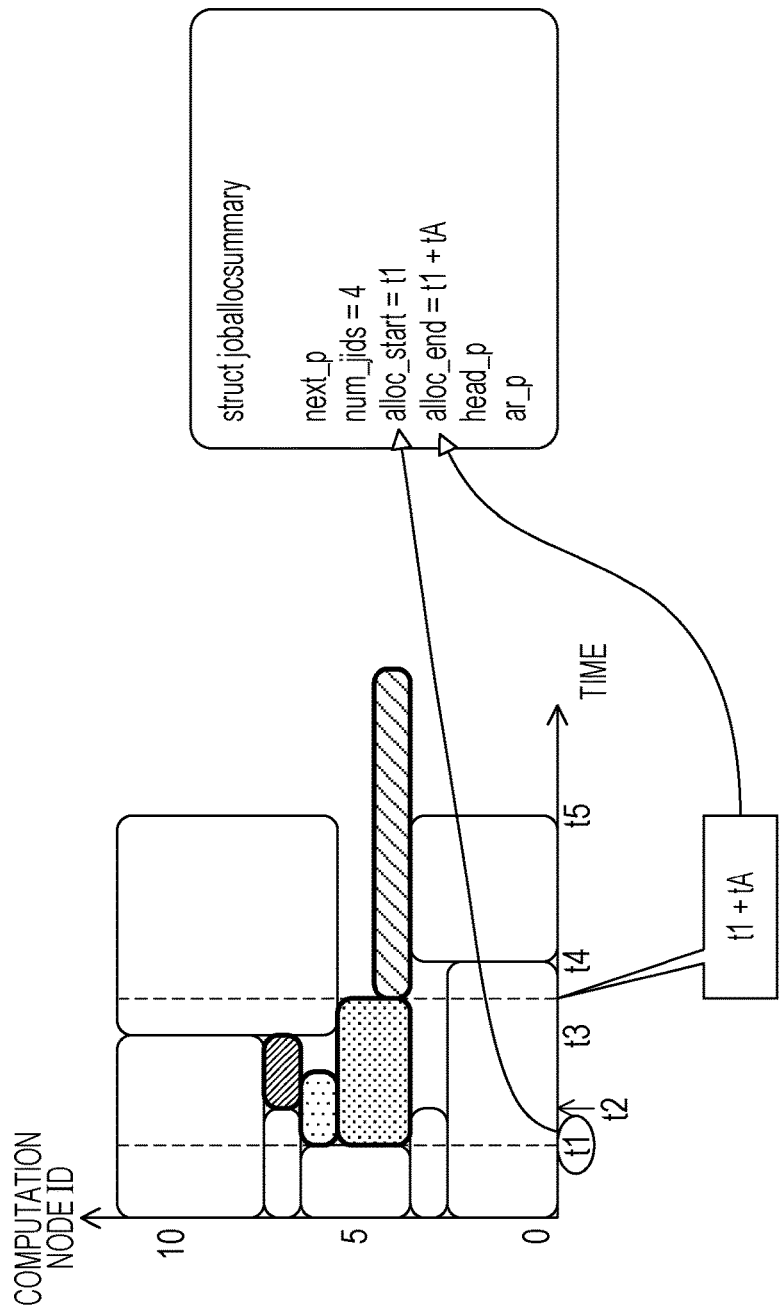

ALLOCATION PATTERN Pt1

ALLOCATION PATTERN Pt2

ALLOCATION PATTERN Pt3

INFORMATION PROCESSING APPARATUS SCHEDULING JOB START TIME

CROSS-REFERENCE TO RELATED APPLICATION

This application is based upon and claims the benefit of priority of the prior Japanese Patent Application No. 2015-134895, filed on Jul. 6, 2015, the entire contents of which are incorporated herein by reference.

FIELD

The embodiments discussed herein are related to an information processing apparatus, a parallel computer system, a job schedule setting program, and a job schedule setting method.

BACKGROUND

A system to execute a process using a plurality of computation nodes in parallel is utilized. In the system, software called a scheduler executed by a node for management performs an allocation of processes to each computation node. For example, a technique has been suggested in which by a backfilling scheduler, jobs in a queue are placed on an unused space on a scheduler map in descending order of a priority and scheduled jobs are executed with the lapse of time (Japanese Laid-open Patent Publication No. 2012-215933). A technique has been suggested in which a small scale job is executed first without allowing the start of execution of a large scale job using many computing resources to be delayed by a backfilling scheduler and an operating ratio of a system is improved (Japanese Laid-open Patent Publication No. 2012-173753).

A technique has been suggested in which two types of schedules of a schedule in which temporal stopping of jobs being executed in a plurality of computing resources is allowed and the other schedule in which the temporal stopping is not allowed are prepared and a suitable schedule is determined by comparing a value indicating profits and a value indicating losses from both schedules (Japanese Laid-open Patent Publication No. 2013-41529 and International Publication Pamphlet No. WO 2012/020474)

A technique has been suggested in which better solutions are searched for, by a process called re-ordering, for solutions found by a priority algorithm in a method of solving a travelling salesman problem or a combinational problem such as job shop scheduling and the like (Japanese Laid-open Patent Publication No. 2005-56421).

As described above, a method is considered in which jobs are sequentially executed according to a priority at the earliest time at which each prioritized job may be executed. However, in this method, free time of computing resources is allocated simply to subsequent jobs according to the priority. For that reason, free time of computing resources is easily fragmentized to be segmented uselessly. However, there is a problem that simply allocating the jobs to the earliest time according to the priority is not necessarily efficient allocation of the computing resources to respective jobs from a viewpoint of scheduling result of a plurality of jobs. The time taken to complete all jobs may become longer.

One aspect of the present disclosure is to provide an information processing apparatus, a parallel computer system, a job schedule setting program, and a job schedule setting method that are capable of achieving an efficient job execution.

SUMMARY

According to an aspect of the invention, an information processing apparatus includes: a memory configured to store information of time zones available for each of a plurality of computation nodes; and a processor configured to execute a process including, obtaining, based on the information, a first time at which a job having the highest priority among a plurality of jobs is able to be executed, and in a case where a second time, which is later than the first time and is a candidate for an execution start time of the job having the highest priority, and from which more jobs are able to be executed in a predetermined time range than a case of executing the job having the highest priority from the first time, is present, allocating the plurality of jobs to the plurality of computation nodes such that the job having the highest priority and one or more other jobs are executed from the second time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of allocation waiting job information;

FIG. 8 is a diagram illustrating an example of a structure that manages an allocation target job;

FIG. 10 is a diagram illustrating an example of a structure that manages available resources;

FIG. 14 is a diagram illustrating an example of a structure that manages a temporary allocation;

FIG. 15 is a diagram illustrating an example of a temporary allocation of jobs using the time as a start point;

DESCRIPTION OF EMBODIMENTS

Hereinafter, embodiments of the preset disclosure will be described in detail with reference to the accompanying drawings.

First Embodiment

Figure 1:
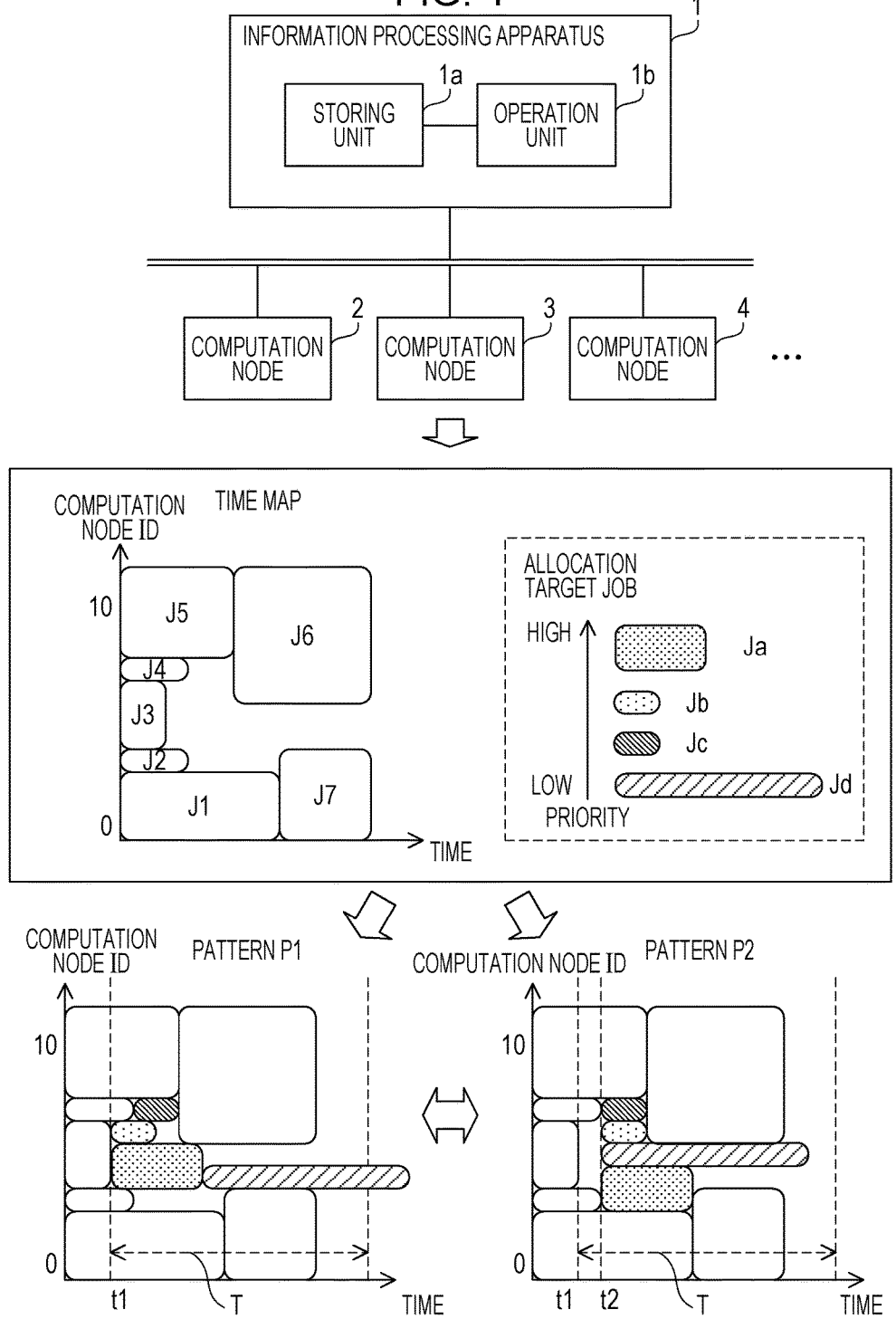
FIG. 1 is a diagram illustrating an information processing apparatus according to a first embodiment.

FIG. 1 is a diagram illustrating an information processing apparatus according to a first embodiment. An information processing apparatus 1 is connected to a plurality of computation nodes through a network. The plurality of computation nodes includes computation nodes 2, 3, and 4. The information processing apparatus 1 executes a plurality of jobs in parallel using the plurality of computation nodes. A job is a unit of processing allocated to each computation node by the information processing apparatus 1. Other information processing apparatuses connected to the network may transmit a job execution request to the information processing apparatus 1.

The information processing apparatus 1 manages jobs by assigning a priority to each job. Normally, a job having a relatively higher priority is started to be executed earlier than other jobs having a relatively lower priority. The job priority may be determined depending on an order of arrival of a job execution request, a priority of a group to which a user belongs or a priority of a user, an importance level of an application that issues a job execution request, or the like. The information processing apparatus 1 allocates a plurality of jobs to a plurality of computation nodes according to a priority. The information processing apparatus 1 allocates processing for a single job over a plurality of computation nodes and allows the job to be executed in parallel by respective computation nodes. Each of the plurality of computation nodes executes a job allocated to each computation node. The information processing apparatus 1 may be referred to as a "computer".

The information processing apparatus 1 identifies each of the plurality of computation nodes by a computation node identifier (ID). The computation node ID is identification information of each of the plurality of computation nodes. For example, the information processing apparatus 1 identifies twelve computation nodes by the computation node IDs "0", to "11".

The information processing apparatus 1 includes a storing unit 1a and an operation unit 1b. The storing unit 1a may be a volatile storage device such as a random access memory (RAM) or a non-volatile storage device such as a hard disk drive (HDD) or any other type of a memory. The operation unit 1b is, for example, a processor. The processor may be a central processing unit (CPU) or a digital signal processor (DSP), or include an integrated circuit such as an application specific integrated circuit (ASIC) or a field programmable gate array (FPGA). The processor executes, for example, a program stored in the RAM. The "processor" may be a set of two or more processors (multiprocessor).

The storing unit 1a stores first information indicating a time zone available for the plurality of computation nodes. The first information may be information indicating a time zone during which no job is allocated, in an available time for each of the plurality of computation nodes. In an example of the first embodiment, jobs J1, J2, J3, J4, J5, J6, and J7 have already been scheduled to a plurality of computation nodes including the computation nodes 2, 3, and 4 (corresponding to time map of FIG. 1). A time zone, which is not allocated to any of jobs, of each computation node is an available time zone during which each computation node is available.

The storing unit 1a stores second information indicating a desired quantity of computation nodes for each of a plurality of jobs. The desired quantity of computation nodes may include, for example, the number of computation nodes used for executing the jobs and use time. For example, it may be considered that the computation node is a single computing device (information processing apparatus or computer). In a case where the computing device includes a plurality of processors, a processor group (and memory used by the processor group) which is a unit of job allocation of the plurality of processors may be regarded as a single computation node. Otherwise, in a case where a processor includes a plurality of cores, a core group (and memory used by the core group) which is a unit of job allocation of the plurality of cores may be regarded as a single computation node.

For example, the second information includes the desired quantity of computation nodes used for execution of each of the jobs Ja, Jb, Jc, and Jd. Each of the jobs Ja, Jb, Jc, and Jd is a job unallocated (unscheduled) to a plurality of computation nodes, and is the current allocation target (scheduling target) job.

Each of jobs Ja, Jb, Jc, and Jd is assigned a priority. A priority of the job Ja is the highest priority. A priority of the job Jb is lower than that of the job Ja and higher than that of the job Jc. A priority of the job Jc is lower than that of the job Jb and higher than that of the job Jd. A priority of the job Jd is the lowest priority.

The operation unit 1b obtains a first time at which the job having the highest priority among the plurality of jobs may be executed, based on the first information and the second information stored in the storing unit 1a. The first time may be regarded as one of the candidate times at which execution of the job having the highest priority is started. For example, the operation unit 1b obtains the time t1 as the first time at which the job Ja having the highest priority among the jobs Ja, Jb, Jc, and Jd may be executed. The operation unit 1b tests temporal scheduling according to the priorities of the jobs Ja, Jb, Jc, and Jd in a case where execution of the job Ja is started from the time t1. In this case, a job having higher priority is scheduled so as not to be executed later than another job having lower priority (scheduling may be made such that execution of the job having higher priority and execution of the another job having lower priority are started at the same time). As a result, the operation unit 1b obtains a pattern P1 of a candidate for scheduling.

The operation unit 1b determines whether a second time, which is later than the first time and is a candidate for an execution start time of a job having the highest priority and from which more jobs are able to be executed in a predetermined time range than a case of executing the job having the highest priority from the first time, is present based on the first information and the second information. The information of the predetermined time range is, for example, a period of time T using the first time as a start point and is stored in the storing unit 1a in advance.

For example, in a case where the time t2 (second time) which is later than the time t1 (first time) is set as the execution start time of the job Ja, the operation unit 1b tests the temporary scheduling according to the priorities of the jobs Ja, Jb, Jc, and Jd. As a result, the operation unit 1b obtains a pattern P2 of the candidate for scheduling. For example, the operation unit 1b compares the pattern P1 with the pattern P2 and determines that the number of job executions in the period of time T for the pattern P2 is greater than that for the pattern P1. Therefore, the operation unit 1b uses the time t2 which is later than the time t1 as the execution start time of the job Ja and thus, determines that a lot more jobs may be executed within a predetermined time range (for example, period of time T) than executing the job Ja at the time t1.

Specifically, in the pattern P1, the execution of the job Jd is not completed in the period of time T and thus, the number of jobs capable of being completed in the period of time T is three jobs Ja, Jb, and Jc. On the other hand, in the pattern P2, four jobs Ja, Jb, Jc, and Jd can be completed in the period of time T. A case where the job Ja starts to be executed at the time t2 rather than a case where the job Ja starts to be executed at the time t1 may allow a lot of more jobs to be executed in the period of time T.

In this case, the operation unit 1b delays the execution start time of the job having the highest priority to be later than the time t1 and allocates the plurality of jobs to the plurality of computation nodes such that the job having the highest priority and other jobs are executed in parallel from the second time. For example, the operation unit 1b delays the execution start time of the job Ja from the time t1 to the time t2, that is, the operation unit 1b adopts the scheduling result of the pattern P2 and allocates the jobs Ja, Jb, Jc, and Jd to the plurality of computation nodes such that the job Ja having the highest priority and other jobs Jb, Jc, and Jd start to be executed at the time t2.

With this, efficient job execution may be obtained. For example, a method is also considered in which jobs are sequentially executed according to a priority at the earliest time at which each prioritized job may be executed. However, simply allocating the jobs to the earliest time according to the priority is not necessarily efficient allocation of the computing resources to respective jobs. The time taken to complete all jobs may become longer. For example, as illustrated in the pattern P1, the execution of some of jobs of the plurality of jobs may not be completed in the period of time T. On the other hand, as illustrated in the pattern P2, the execution start time of the job Ja having the highest priority is delayed from the time t1 to the time t2 and thus, the execution of all of the plurality of jobs may be completed in the period of time T.

The information processing apparatus 1 also takes subsequent jobs Jb, Jc, and Jd into account when scheduling the job Ja. Specifically, the information processing apparatus 1 acquires a plurality of patterns which become the candidates for scheduling the jobs Ja, Jb, Jc, and Jd and adopts a pattern capable of executing more jobs in the period of time T by comparing the acquired plurality of patterns with each other. The information processing apparatus 1 performs allocation of jobs to the respective computation nodes according to the adopted pattern. For example, in the pattern P2, the time taken to complete the execution of all jobs Ja, Jb, Jc, and Jd may become shorter than the pattern P1. In the pattern P2, free time of the computation node can be decreased more than in the pattern P1 and the job throughput may be improved while maintaining the job priority. Efficient job execution may be obtained.

Second Embodiment

Figure 2:
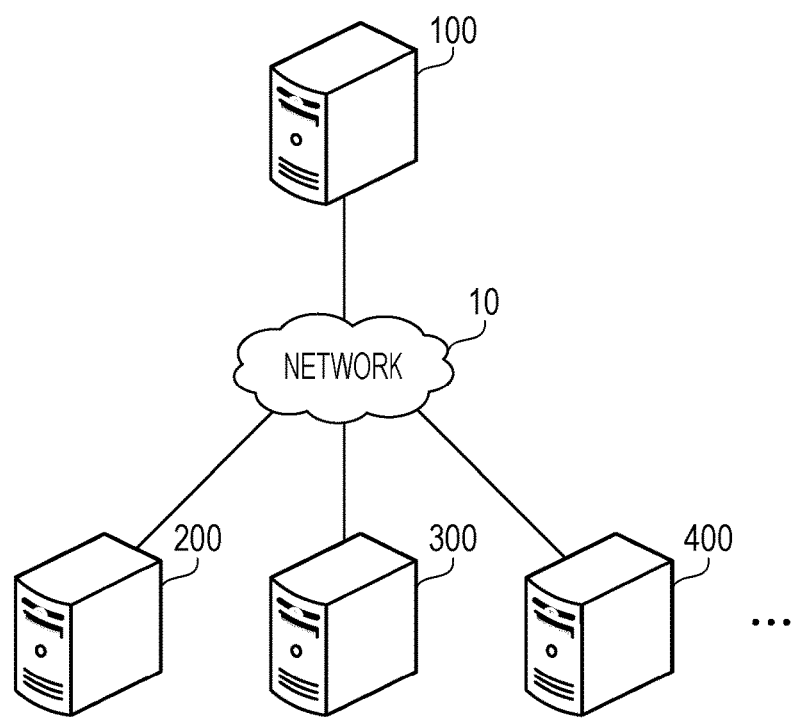
FIG. 2 is a diagram illustrating a parallel computer system according to a second embodiment.

FIG. 2 is a diagram illustrating a parallel computer system according to a second embodiment in order to more specifically describe the first embodiment. The parallel computer system according to the second embodiment includes a management node 100 and a plurality of computation nodes. The plurality of computation nodes includes computation nodes 200, 300, and 400. The management node 100 and the plurality of computation nodes are connected to a network 10. The network 10 is, for example, a local area network (LAN).

The management node 100 performs allocation of a plurality of jobs to the plurality of computation nodes. The management node 100 may receive a job execution request from other information processing apparatuses (not illustrated) through the network 10. The management node 100 is an example of the information processing apparatus 1 according to the first embodiment.

The computation nodes 200, 300, and 400 execute jobs allocated by the management node 100. In the example according to the second embodiment, each of the computation nodes 200, 300, and 400 is a single computing device (other computation nodes are also similar). The computation nodes 200, 300, and 400 are an example of the computation nodes 2, 3, and 4 according to the first embodiment.

In the parallel computer system according to the second embodiment, a plurality of jobs are allocated to a plurality of computation nodes by the management node 100 and thus the plurality of jobs may be executed in parallel. In the example of the parallel computer system according to the second embodiment, a computation node, to which execution of a certain job is allocated in a certain time zone, exclusively is occupied in order to execute the job in the time zone. A desired quantity of computing resources allocated to a certain job may be expressed as "number of computation nodes×exclusive occupation time" (desired quantity of computing resources can be regarded as desired quantity of computation nodes).

As described above, a system for achieving high speed processing by processing a plurality of jobs in parallel by the plurality of computation nodes is called a high performance computing (HPC) system.

Figure 3:
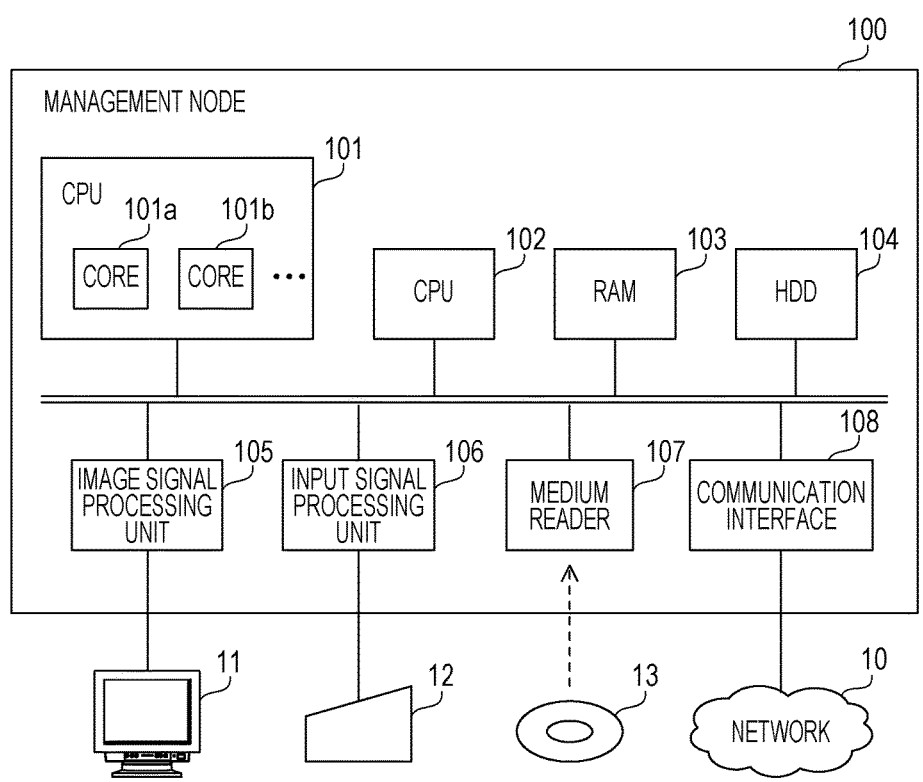
FIG. 3 is a block diagram illustrating an example of hardware of a management node.

FIG. 3 is a block diagram illustrating an example of hardware of a management node. The management node 100 includes CPUs 101 and 102, a RAM 103, an HDD 104, an image signal processing unit 105, an input signal processing unit 106, a medium reader 107, and a communication interface 108. These hardware units are connected to a bus inside the management node 100. The CPUs 101 and 102 are an example of the operation unit 1b according to the first embodiment and the RAM 103 or the HDD 104 are an example of the memory or the storing unit 1a according to the first embodiment.

The CPUs 101 and 102 are processors each of which includes a single or two or more cores executing program instructions. For example, the CPU 101 includes a plurality of cores including the cores 101a and 101b. A plurality of cores belonging to the same or different CPUs may execute instructions in parallel with each other. Each of the CPUs 101 and 102 loads at least a portion of a program or data stored in the HDD 104 onto the RAM 103 to execute the program. Each core may be referred to as a "processor". A set of the plurality of cores may be referred to as a "processor" (multiprocessor).

The RAM 103 is a volatile memory that temporarily stores the program executed by the CPUs 101 and 102 and the data used for operation by the CPUs 101 and 102. The management node 100 may be provided with a kind of memory other than the RAM and also be provided with a plurality of memories.

The HDD 104 is a non-volatile storage device that stores a software program such as an operating system (OS) or application software and data. The management node 100 may be provided with other kinds of storage devices such as a flash memory or a solid state drive (SSD) and provided with a plurality of non-volatile storage devices.

The image signal processing unit 105 outputs an image to a display 11 connected to the management node 100 according to the instructions from the CPUs 101 and 102. The display 11 may include a cathode ray tube (CRT) display, a liquid crystal display (LCD), a plasma display panel (PDP), an organic electro-luminescence (OEL) or the like.

The input signal processing unit 106 acquires an input signal from an input device 12 connected to the management node 100 and outputs the input signal to at least one CPU. The input device 12 may include a pointing device such as a mouse, a touch panel, a touch pad, or a track ball, a keyboard, a remote controller, a button switch or the like. A plurality of kinds of input devices may be connected to the management node 100.

The medium reader 107 is a read device to read a program or data stored in a recording medium 13. The recording medium 13 may include, for example, a magnetic disk such as a flexible disk (FD) or the HDD, an optical disk such as a compact disc (CD), or a digital versatile disc (DVD), a magneto-optical disk (MO), a semiconductor memory or the like. The medium reader 107 stores the program or data read from the recording medium 13 in the RAM 103 or the HDD 104.

The communication interface 108 is an interface connected to the network 10 and communicates with other information processing apparatuses including the plurality of computation nodes through the network 10. The communication interface 108 may be a wired communication interface connected to a communication device such as a switch through a cable and also a wireless communication interface connected to a base station through a wireless link.

The number of CPUs provided in the management node 100 may be one or more. The management node 100 may not include the medium reader 107. In a case where the management node 100 is controlled through the network 10 from the terminal apparatus operated by the user, the management node 100 may not include the image signal processing unit 105 or the input signal processing unit 106. The management node 100 may not include the communication interface 108. The display 11 or the input device 12 may be integrally formed with a case of the management node 100.

Furthermore, respective computation nodes including the computation nodes 200, 300, and 400 may also be realized by using the similar units as those of the management node 100. The respective computation nodes may not include the image signal processing unit 105, the input signal processing unit 106, and the medium reader 107, similar to the management node 100.

Figure 4:
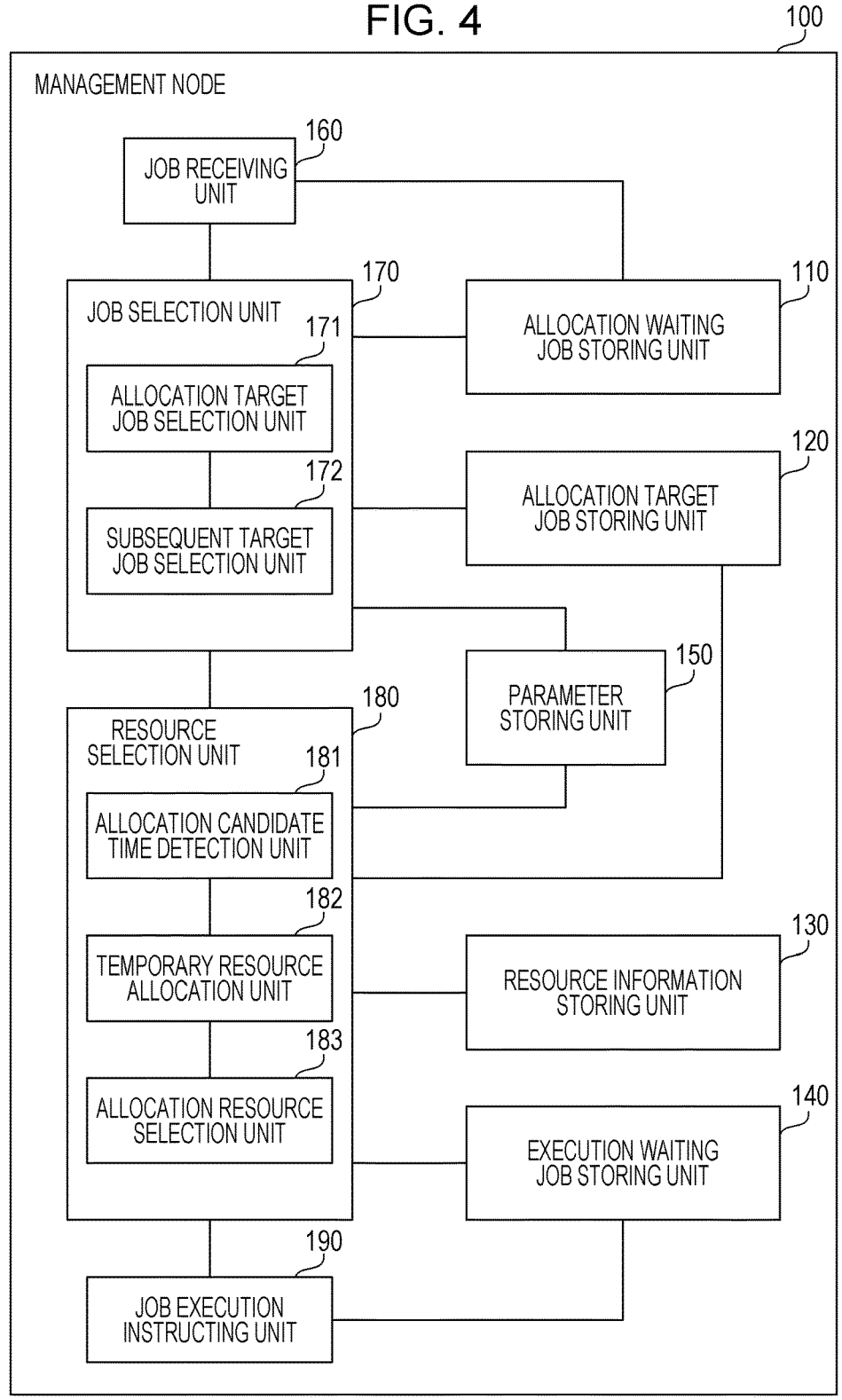
FIG. 4 is a block diagram illustrating an example of functionalities of the management node.

FIG. 4 is a block diagram illustrating an example of functionalities of the management node. The management node 100 includes an allocation waiting job storing unit 110, an allocation target job storing unit 120, a resource information storing unit 130, an execution waiting job storing unit 140, a parameter storing unit 150, a job receiving unit 160, a job selection unit 170, a resource selection unit 180, and a job execution instructing unit 190.

The allocation waiting job storing unit 110, the allocation target job storing unit 120, the resource information storing unit 130, the execution waiting job storing unit 140, and the parameter storing unit 150 may be realized as a storing area secured in the RAM 103 or the HDD 104. The job receiving unit 160, the job selection unit 170, the resource selection unit 180, and the job execution instructing unit 190 may be realized by causing the CPUs 101 and 102 to execute a program stored in the RAM 103. The software equipped with functionalities of the job receiving unit 160, the job selection unit 170, the resource selection unit 180, and the job execution instructing unit 190 may be referred to as a "job scheduler".

The allocation waiting job storing unit 110 stores information (allocation waiting job information) of a job to which resources are not allocated among jobs supplied. In the following description, the job to which resources are not allocated among jobs supplied may be referred to as an "allocation waiting job". The allocation waiting job information includes a desired quantity of computing resources ("number of computation nodes"×"exclusive occupation time") used for executing the job. The allocation waiting job information may include information (information of arrival time of each job, issuance source application, user utilizing the application and the like) used for determining a priority which will be described later.

The allocation target job storing unit 120 stores information of a job to be used for a computing resource allocation target this time. The information stored in the allocation target job storing unit 120 includes allocation target job information and subsequent target job information.

The allocation target job information includes information indicating a job having the highest scheduling priority among the allocation waiting jobs. Here, the job having the highest scheduling priority among the allocation waiting jobs may be referred to as an "allocation target job".

The subsequent target job information includes information indicating a job to be used for a temporary allocation evaluation target along with the allocation target job. The job to be used for the temporary allocation evaluation target along with the allocation target job may be referred to as a "subsequent target job".

The "temporary allocation" indicates that allocation of computing resources to the allocation target job and the subsequent target job is temporarily performed (without affecting the real scheduling) from a certain allocation candidate time to a temporary allocation tail time. The "allocation candidate time" indicates the time at which the temporary allocation is performed for the allocation target job during the time at which the allocation target job may be allocated. The "temporary allocation tail time" indicates an end of time when the temporary allocation is performed.

The resource information storing unit 130 stores information (available resource information) of computing resources available for job execution. The computing resource information is information indicating how much time is available for the job execution in a certain computation node at a certain time.

The execution waiting job storing unit 140 stores information (execution waiting job information) of a job to which the computing resources for the computation node are allocated (may be regarded as having been scheduled) and which is waiting for execution by the computation node. In the following description, the job which is waiting for execution by the computation node may be referred to as an "execution waiting job". The resource selection unit 180 executes selection of the computing resource to be allocated to the execution waiting job.

The parameter storing unit 150 stores parameter information used for processing of the job selection unit 170 and the resource selection unit 180. For example, the parameter information includes information which becomes subsequent target job selection criteria or information which becomes computing resource selection criteria.

The job receiving unit 160 receives a job execution request. The job receiving unit 160 stores the allocation waiting job information in the allocation waiting job storing unit 110 according to the received job execution request. The job execution request may be issued by an application which operates on the management node 100 and also be issued by other information processing apparatuses different from the management node 100 or the computation nodes 200, 300, and 400.

The job selection unit 170 sorts the allocation waiting jobs according to a predetermined priority based on the allocation waiting job information stored in the allocation waiting job storing unit 110. The job selection unit 170 determines a job priority depending on an order of arrival of a job execution request, a priority of a group to which a user belongs to or a user, an importance level of an application that issues a job execution request, or the like. Here, the job selection unit 170 includes an allocation target job selection unit 171 and a subsequent target job selection unit 172.

The allocation target job selection unit 171 generates allocation target job information based on the allocation waiting job information stored in the allocation waiting job storing unit 110 and stores the allocation target job information in the allocation target job storing unit 120. The allocation target job information includes information indicating a top job (allocation target job) and a tail job among a plurality of jobs to be used for the computing resource allocation target this time. The top job (allocation target job) is a job having the highest priority among the plurality of jobs. The tail job is a job having the lowest priority among the plurality of jobs The subsequent target job selection unit 172 generates subsequent target job information based on the allocation waiting job information stored in the allocation waiting job storing unit 110 and stores the subsequent target job information in the allocation target job storing unit 120. The subsequent target job selection unit 172 performs selection of the subsequent target job in order of the job priority. For example, there is a possibility that if the number of allocation waiting jobs increases, it takes a long time to evaluate the subsequent target job. For that reason, for example, the upper limit value of the number of jobs to be evaluated for temporary allocation in the parameter information is determined in advance. The subsequent target job selection unit 172 selects the subsequent target jobs until the number of jobs to be evaluated reaches the upper limit value. Additionally, a limitation value of the number of allocation waiting jobs according to the amount of free computing resources in the system may be designated in the parameter information in advance. Otherwise, the number of all allocation waiting jobs stored in the allocation waiting job storing unit 110 may be used as the upper limit value of the number of subsequent target jobs.

As described above, the management node 100 designates the top job and the tail job by the allocation target job information to specify a series of jobs from the top job to the tail job as the evaluation target job for allocation based on the subsequent target job information.

The resource selection unit 180 performs allocation of the computing resources to the allocation target job and the subsequent target job based on the allocation target job information and subsequent target job information stored in the allocation target job storing unit 120. The resource selection unit 180 includes an allocation candidate time detection unit 181, a temporary resource allocation unit 182, and an allocation resource selection unit 183.

The allocation candidate time detection unit 181 specifies the allocation target job based on the allocation target job information stored in the allocation target job storing unit 120. The allocation candidate time detection unit 181 detects a plurality of candidates (allocation candidate time) for the time of the start point at which the computing resources are to be allocated to the allocation target job based on the resource information stored in the resource information storing unit 130 and the parameter information stored in the parameter storing unit 150.

The temporary resource allocation unit 182 performs the temporary allocation of the computing resources to the allocation target job and the subsequent target job using each of the plurality of allocation candidate times detected by the allocation candidate time detection unit 181 as the start point. For example, the temporary resource allocation unit 182 tests placing of the allocation target job and the subsequent target job on the time map using a first allocation candidate time as a start point by paying attention to the first allocation candidate time. The temporary resource allocation unit 182 tests placing of the allocation target job and the subsequent target job on the time map using a second allocation candidate time as a start point by paying attention to the second allocation candidate time. The job priority is taken into account for the job placement. As a result, the temporary resource allocation unit 182 obtains a plurality of candidates for the allocation patterns of computing resources to the allocation target job and the subsequent target job. The candidate for the allocation pattern may be referred to as a temporary allocation pattern. The temporary resource allocation unit 182 stores information of a plurality of temporary allocation patterns in the resource information storing unit 130.

The allocation resource selection unit 183 selects the temporary allocation patterns of computing resources to be adopted for the allocation target job and the subsequent target job based on information of the plurality of temporary allocation pattern stored in the resource information storing unit 130. The selection criteria are registered in, for example, the parameter information stored in the parameter storing unit 150 in advance. For example, the parameter information may include information indicating conditions such as (1) the number of jobs executable during a predetermined period of time is large, (2) the execution of each job is completed quickly, and (3) the amount of free computing resources during a predetermined period of time is small, as the criteria used for selecting the temporary allocation pattern. The predetermined period of time is a time range determined in advance and may be a fixed period of time which uses the earliest time, at which the job having the highest priority may be executed, as the start point and which is later than the time. The predetermined period of time may be a fixed period of time which uses the current time as the start point and is later than the time. Each condition has a relative weighting with respect to other conditions. The pattern selection priority becomes higher as it becomes suitable for the condition having larger weighting. The allocation resource selection unit 183 generates an execution waiting job information based on the selected temporary allocation pattern and stores the generated execution waiting job information in the execution waiting job storing unit 140.

The job execution instructing unit 190 instructs each of the plurality of the computation nodes to execute the job based on the execution waiting job information stored in the execution waiting job storing unit 140.

Figure 5:
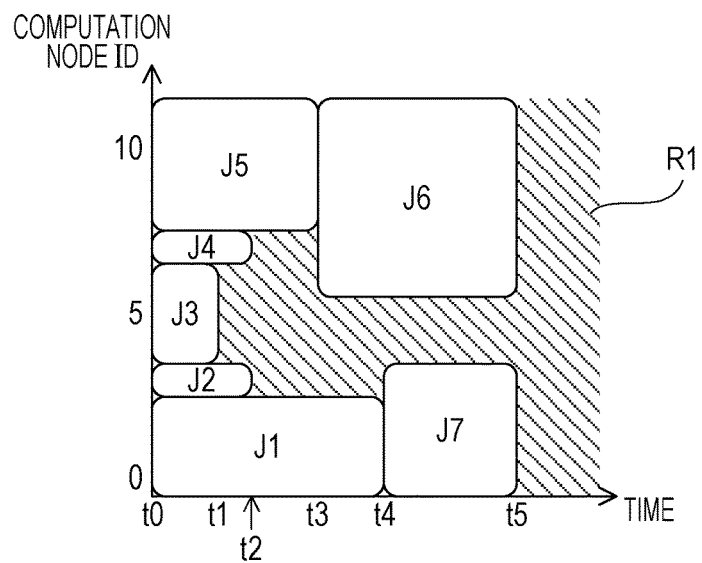
FIG. 5 is a diagram illustrating an example of a time map.

FIG. 5 is a diagram illustrating an example of a time map. In FIG. 5, a state where execution of seven jobs J1, J2, J3, J4, J5, J6, and J7 is allocated to twelve computation nodes is illustrated. The computation nodes are identified by the computation nodes IDs. For example, the twelve computation nodes are assigned the computation node IDs "0" to "11". The information indicating schedule contents illustrated in FIG. 5 may be referred to as a time map. In FIG. 5, the time t0 to the time t5 at which a certain job is started or completed are illustrated.

According to the example of FIG. 5, in a period of time of the time t0 to the time t4, the job J1 is allocated to three computation nodes represented by the computation node IDs "0" to "2". In a period of time of the time t0 to the time t2, the job J2 is allocated to one computation node represented by the computation node ID "3". In a period of time of the time t0 and the time t1, the job J3 is allocated to three computation nodes represented by the computation node IDs "4" to "6". In a period of time of the time t0 to the time t2, the job J4 is allocated to one computation node represented by the computation node ID "7". In a period of time of the time t0 to the time t3, the job J5 is allocated to four computation nodes represented by the computation node IDs "8" to "11". In a period of time of the time t3 to the time t5, the job J6 is allocated to six computation nodes represented by the computation node IDs "6" to "11". In a period of time of the time t4 and the time t5, the job J7 is allocated to four computation nodes represented by the computation node IDs "0" to "3". Regarding the twelve computation nodes, after the time t0, the computing resources other than the computing resources having been allocated to the jobs J1, J2, J3, J4, J5, J6, and J7 are an available resource R1. The available resource R1 can be allocated to a new job.

Figure 6:
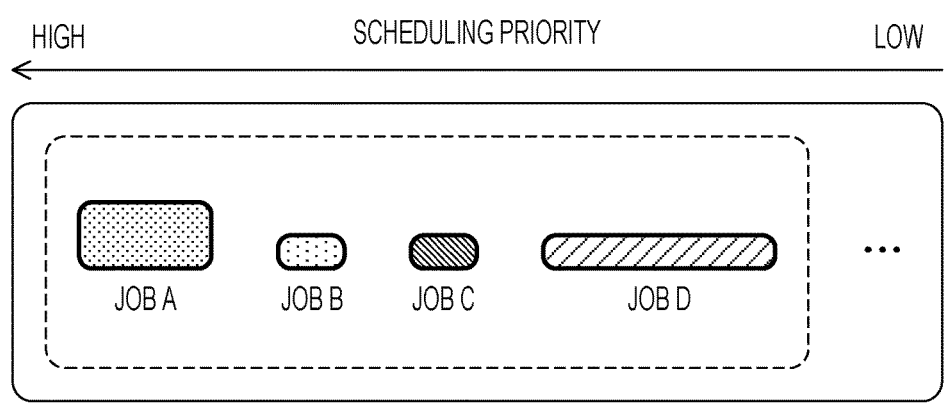
FIG. 6 is a diagram illustrating an example of priorities of allocation waiting jobs.

FIG. 6 is a diagram illustrating an example of priorities of allocation waiting jobs. The jobs are identified by job IDs. In the following description, a job having a job ID of "A" is denoted by a "job A".

For example, the allocation waiting jobs include job A, job B, job C, job D, . . . . The allocation target job selection unit 171 refers to the allocation waiting job storing unit 110 and selects, for example, the job A as an allocation target job. The subsequent target job selection unit 172 selects the jobs B, C, and D as the subsequent target jobs. The priority of each job (scheduling priority) is taken into account when the allocation target job is selected. That is, the allocation target job selection unit 171 selects the allocation target job in descending order of priority of the allocation waiting job. The top job is the job A. The tail job is the job D. In this case, the allocation target job selection unit 171 identifies the tail job as the job D. The matter regarding how many jobs are to be selected as the allocation target job is set in the parameter storing unit 150 as the parameter information described above in advance (for example, information to select four jobs is set in advance).

FIG. 7 is a diagram illustrating an example of allocation waiting job information. The allocation waiting job information 111 is stored in the allocation waiting job storing unit 110. The allocation waiting job information 111 includes items for a job ID, a requested resource amount, and resource use time.

In the item of the job ID, job identification information (job ID) is registered. In the item of the requested resource amount, the number of computation nodes requested for executing the corresponding job is registered. In the item of the resource use time, the use time of each computation node requested for executing the corresponding job is registered.

For example, information that the job ID is "A", the requested resource amount is "2", and the resource use time is "tA" is registered in the allocation waiting job information 111. The information indicates that the allocation waiting job A is a job being executed while exclusively occupying two computation nodes for the time tA. In this case, a desired quantity for the computing resources of the job A is 2×tA.

In the allocation waiting job information 111, information on the requested resource amount and the resource use time is registered similarly, also regarding other jobs. The job B is a job being executed while exclusively occupying one computation node for the time tB.

The job C is a job being executed while exclusively occupying one computation node for the time tC. The job D is a job being executed while exclusively occupying one computation node for the time tD.

The allocation waiting job information 111 may include information used for determination of the priority. The information used for determination of the priority may include information such as, for example, an order of arrival of a job execution request, software of an issuance source of a job execution request or a user who uses the software (or a group to which the user belongs). Otherwise, respective records of the allocation waiting job information 111 may be sorted in order of the priority.

FIG. 8 is a diagram illustrating an example of a structure that manages an allocation target job. The allocation target job information and the subsequent target job information are used for managing the allocation target job and the subsequent target job. The allocation target job information and the subsequent target job information are stored in the allocation target job storing unit 120. In FIG. 8, examples of a structure 121 of the allocation target job information (schedjobinfo) and a structure 122 of the subsequent target job information (jobinfo) are illustrated.

The structure 121 is an example of a structure of the allocation target job information. The structure 121 includes the number of job information (num_jobs), a pointer to head job information (jobinfo *head_p), and a pointer to tail job information (jobinfo *tail_p). The number of job information is the number of the subsequent target job information (top job, tail job, and the number of jobs from top job to tail job) indicated by the allocation target job information. The pointer to head job information indicates a storage address on the RAM 103 of the subsequent target job information corresponding to the top job. The pointer to tail job information indicates a storage address on the RAM 103 of the subsequent target job information corresponding to the tail job. Specific data stored in the RAM 103 using the structure 121 may be referred to as an instance of the structure 121 (other structures are also similar). The allocation target job information is a single instance of the structure 121.

The structure 122 is an example of a structure of the subsequent target job information. The structure 122 includes information of a pointer to next job information (jobinfo *next_p), a job ID (jid), a requested resource amount (num_reqnids), and resource use time (timespec reqtime). The pointer to next job information indicates a storage address on the RAM 103 of the subsequent target job information. The information of the job ID, the requested resource amount, and the resource use time is information corresponding to the item having the same name as that in the allocation waiting job information 111 illustrated in FIG. 7. The allocation job information is a single instance of the structure 122. The allocation target job information may be prepared for each job using the structure 122.

Figure 9:
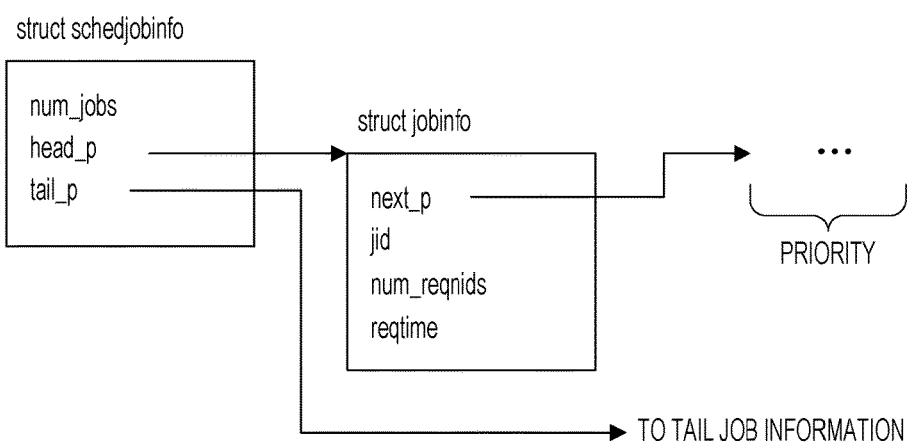
FIG. 9 is a diagram illustrating an example of managing an allocation target job according to a priority.

FIG. 9 is a diagram illustrating an example of managing an allocation target job according to a priority. The allocation target job and the subsequent target job are managed, according to the priority of each job, by the allocation target job information and the subsequent target job information.

Specifically, the subsequent target job information indicated by the pointer to head job (head_p) is the head job information (allocation target job). On the other hand, the subsequent target job information indicated by the pointer to tail job (tail_p) is the tail job information. The tail job has the lowest priority among the allocation target job and the subsequent target job. The job information of a job having a low priority second to the priority of the corresponding job is indicated by the pointer to next job information (next_p). The management node 100 manages job rankings from the top job to the tail job in descending order of priority using the data structure described above.

FIG. 10 is a diagram illustrating an example of a structure that manages an available resource. Available resource management information, available resource information, resource information, temporary allocation work information, and temporary allocation job information are used for managing the available resource. The available resource management information, the available resource information, the resource information, the temporary allocation work information, and the temporary allocation job information are stored in the resource information storing unit 130. In FIG. 10, examples of a structure 131 of available resource management information (availrschead), a structure 132 of available resource information (availrsc), a structure 133 of resource information (availrscinfo), a structure 134 of temporary allocation work information (allocrscinfo), and a structure 135 of temporary allocation job information (allocrscjobinfo) are illustrated.

The structure 131 is an example of a structure of available resource management information. The structure 131 includes a pointer to head available resource information (availrsc *head_p). The available resource management information is a single instance of the structure 131.

The structure 132 is an example of a structure of available resource information. The structure 132 includes a pointer to next element (available resource information) (availrsc *next_p), the time of available resource (timespec time), the number of resource information (num_rsc), the pointer to head resource information (availrscinfo *arihead_p), and the pointer to tail resource information (availrscinfo *aritail_p).

The time of available resource is a start time of a period of time during which the computing resources are free. In the available resource information, information (resource information) of one or more computing resources available from the start time is managed. The number of resource information is the number of resource information managed by the available resource information. The pointer to head resource information indicates a storage address on the RAM 103 of the head resource information. The pointer to tail resource information indicates a storage address on the RAM 103 of the tail resource information. The available resource information is a single instance of the structure 132. The available resource information may be prepared for each time of available resource using the structure 132.

The structure 133 is an example of a structure of resource information. The structure 133 includes a pointer to next resource information (availrscinfo *next_p), a pointer to previous resource information (availrscinfo *prev_p), an available time for computing resource (timespec availtime), the number of available nodes (num_nids), a pointer indicating an available node ID (*nids_p), and a temporary allocation work area (allocrscinfo allocinfo).

The pointer to next resource information indicates a storage address on the RAM 103 of the next resource information. The pointer to previous resource information indicates a storage address on the RAM 103 of the previous resource information. The available time for computing resource is a period of time during which the computing resources are available using the time included in the available resource information as a start point. A single period of time in the time map can be designated by the time and the available time. The number of available nodes is the number of available computation nodes. The pointer indicating the available node ID indicates a storage address on the RAM 103 in which a list of the computation node IDs of the available computation node is stored. The temporary allocation work area is information for work used for temporarily allocating the computing resource to the job. The resource information is a single instance of the structure 133. A plurality of pieces of resource information may be prepared using the structure 133.

The structure 134 is an example of a structure of temporary allocation work information. The structure 134 includes a total number of temporary allocation nodes (total_alloc_nids), the number of temporary allocation job information (num_ajs), and a pointer to head temporary allocation job information (allocrscjobinfo *aj_p).

The total number of temporary allocation nodes is the number of computation nodes to which the job has been temporarily allocated. The number of temporary allocation job information is the number of information (that is, corresponding job) of jobs temporarily allocated. The pointer to head temporary allocation job information indicates a storage address on the RAM 103 of the head temporary allocation job information. The temporary allocation work information is a single instance of the structure 134. A plurality of pieces of temporary allocation work information may be prepared using the structure 134.

The structure 135 is an example of a structure of temporary allocation job information. The structure 135 includes a pointer to next temporary allocation job information (allocrscjobinfo *next_p), a job ID (jid), and the number of acquired resources (num_alloc_nids). The pointer to next temporary allocation job information indicates a storage address on the RAM 103 of the next temporary allocation job information. The job ID is a job ID of a job temporarily allocated. The number of acquired resources is the number of the computation nodes (allocated to the job) acquired by the job indicated by the job ID. The temporary allocation job information is a single instance of the structure 135. A plurality of pieces of temporary allocation job information may be prepared by the structure 135.

Figure 11:
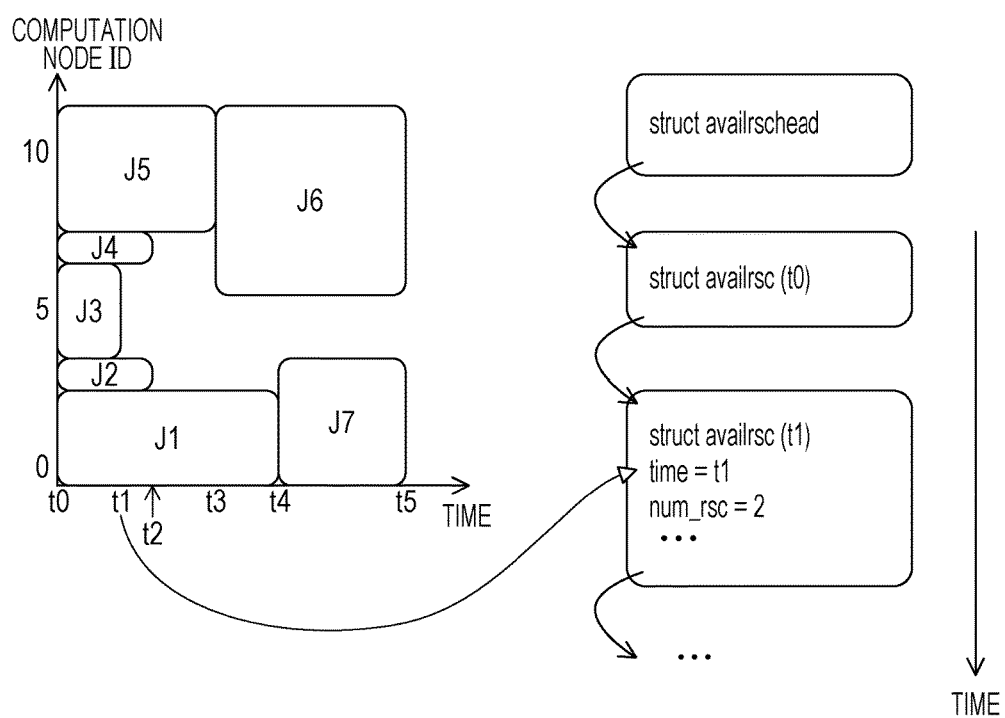
FIG. 11 is a diagram illustrating an example of managing an available resource for each time.

FIG. 11 is a diagram illustrating an example of managing an available resource for each time. The available resources for each of times t0, t1, t2, t3, t4, and t5 are managed by the available resource information. The available resource management information includes a pointer to the head available resource information. Here, each piece of the available resource information is connected to each other by a pointer (availrsc *next_p) in order of earlier in time. In the times t0 to t5, the time t0 is the earliest time. The head available resource information serves as the available resource information related to the time t0.

Thereafter, the pointer of the available resource information of the time t0 indicates the available resource information of the time t1. The pointer of the available resource information of the time t1 indicates the available resource information of the time t2 (illustration of the available resource information after the time t2 is omitted). The pointer of the available resource information of the time t3 indicates the available resource information of the time t4. The pointer of the available resource information of the time t4 indicates the available resource information of the time t5.

Figure 12:
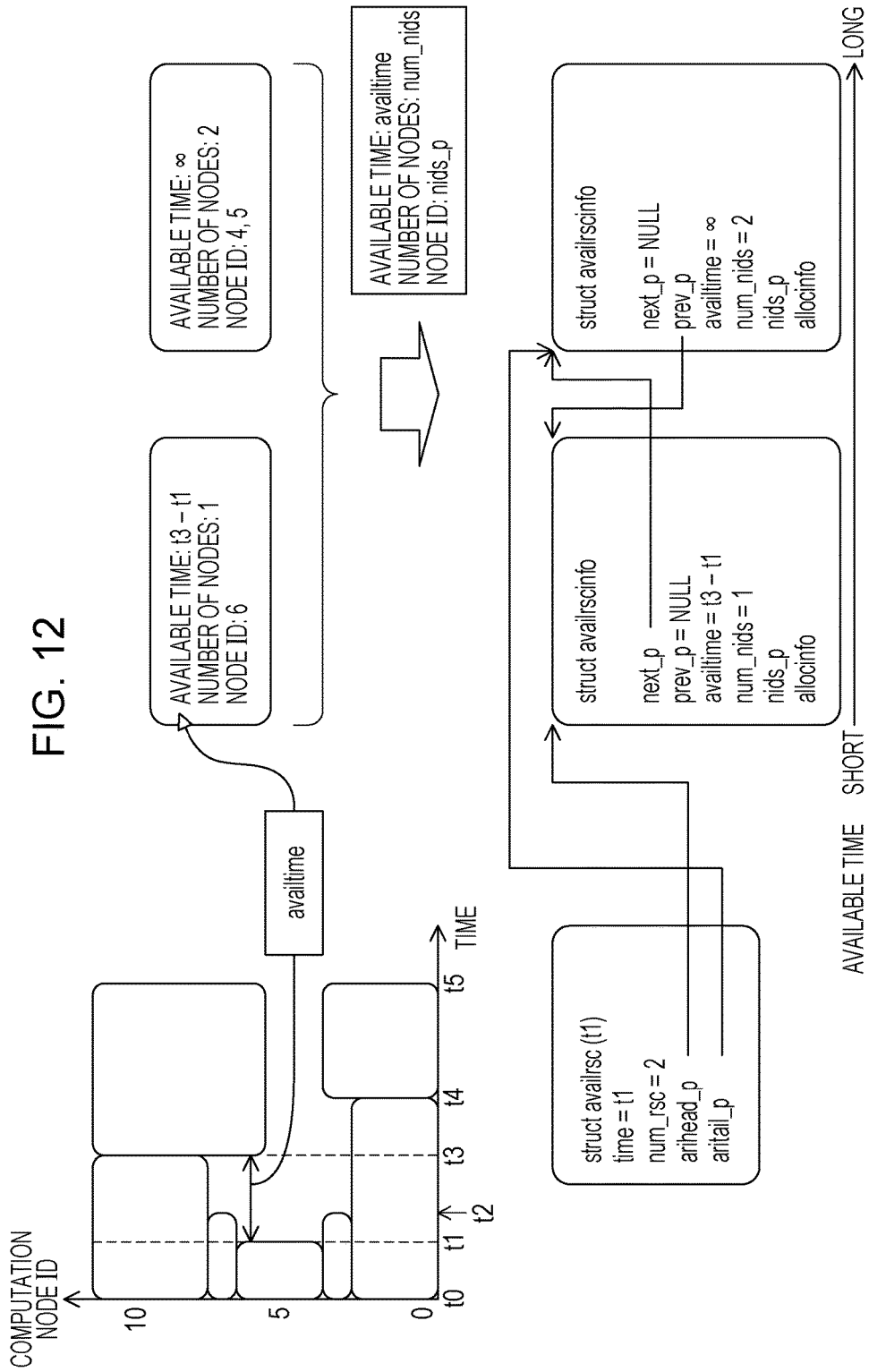
FIG. 12 is a diagram illustrating an example of managing an available resource for time t1.

FIG. 12 is a diagram illustrating an example of managing an available resource corresponding to the time t1. In the time t1, the available resources are divided into the following two available resources. A first available resource is a time zone of t3−t1 (available time) after the time t1 of a single computation node having the computation node ID "6". An operation of t3−t1 for the time is an operation to obtain a time difference between the time t3 and the time t1 (other times are also similar). That is, the computation node ID "6" is available from the time t1 to the time t3. A second available resource is a time zone (no upper limit) after the time t1 of two computation nodes having the computation node IDs "4" and "5" (In the figure, the available time for the case is represented by an infinite symbol "∞".

The available time corresponds to the availtime in the structure 133. The number of available nodes corresponds to the num_nids in the structure 133. The available node ID corresponds to information indicated by the pointer nids_p of the structure 133. The first available resource and the second available resource in the time t1 are managed by two pieces of resource information. Respective pieces of resource information are connected to each other in order of short available time.

Specifically, in the available resource information of the time t1, the num_rsc becomes "2". The pointer arihead_p indicates the first resource information corresponding to the first available resource. The pointer aritail_p indicates the second resource information corresponding to the second available resource.

The first resource information includes next information. The pointer next_p indicates the second resource information. Since previous resource information is not present in the first resource information, the pointer prev_p is NULL. The availtime is "t3−t1". The num_nids is "1". The pointer nids_p indicates the node ID "6". The allocinfo is a temporary allocation work area to the first available resource.

The second resource information includes next information. Since next resource information is not present in the second resource information, the pointer next_p is NULL. The pointer prev_p indicates the first resource information. The availtime is "." (infinite). The num_nids is "2". The nids_p indicates the node IDs "4" and "5". The allocinfo is a temporary allocation work area to the second available resource.

Figure 13:
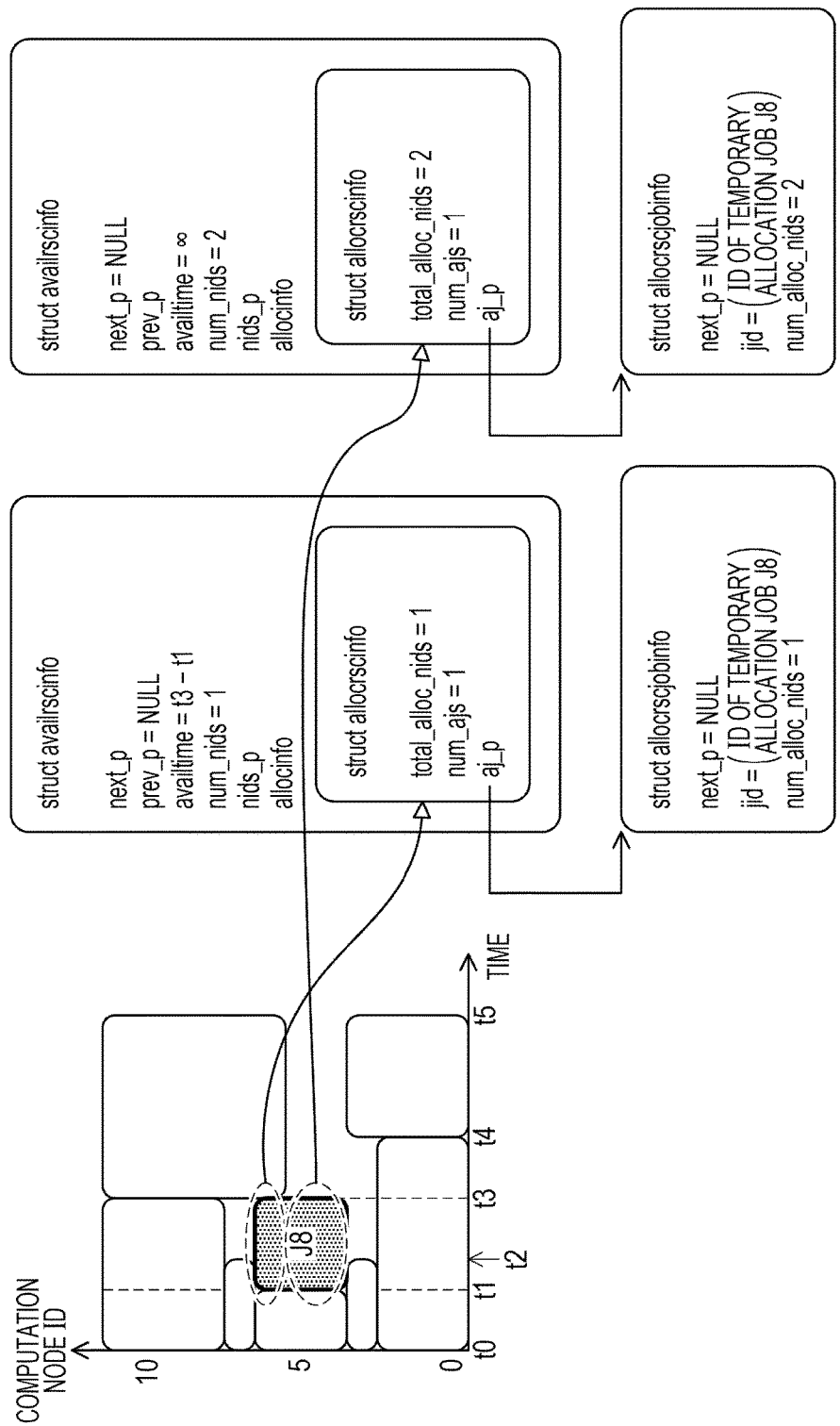
FIG. 13 is a diagram illustrating an example of managing a job allocated to time.

FIG. 13 is a diagram illustrating an example of managing a job allocated to the time t1. In FIG. 13, the temporary allocation work information in a case where the job J8 is temporarily started to be executed at the time t1 is illustrated. Here, it is assumed that a desired quantity for the computing resources of the job J8 includes three computation nodes and use time t3−t1. In this case, the job J8 may be executed using the available resources in the time t1. In a case where the available resources in the time t1 are allocated to the job J8, a temporary allocation situation for the job J8 is managed by the first resource information and the second resource information illustrated in FIG. 12.

Specifically, in the first resource information, the temporary allocation work area (temporary allocation work information) allocinfo includes next information. The total_alloc_nids is "1". The num_ajs is "1". The pointer aj_p indicates the first temporary allocation job information related to the job J8.

The first temporary allocation job information includes the following information. The temporarily allocated job is a single job (only job J8) and thus, the pointer next_p is NULL. The jid is a job ID of the temporarily allocated job J8 (denoted by "ID of temporarily allocated job J8" in FIG. 13). The num_alloc_nids is "1" (since the temporarily allocated computation node is a single computation node having a computation node ID "6").

In the second resource information, the temporary allocation work area (temporary allocation work information) allocinfo includes next information. The total_alloc_nids is "2". The num_ajs is "1". The pointer aj_p indicates the second temporary allocation job information related to the job J8.

The second temporary allocation job information includes the following information. The temporarily allocated job is a single job (only job J8) and thus, the pointer next_p is NULL. The jid is a job ID of the temporarily allocated job J8. The num_alloc_nids is "2" (since the temporarily allocated computation nodes are two computation nodes having the computation node IDs "4" and "5").

FIG. 14 is a diagram illustrating an example of a structure that manages temporary allocation. The temporary allocation is managed by using temporary allocation management information, temporary allocation information, job allocation information, and job allocation resource information. The temporary allocation management information, the temporary allocation information, the job allocation information, and the job allocation resource information are stored in the resource information storing unit 130. In FIG. 14, examples of a structure 136 of temporary allocation management information (joballocsummaryhead), a structure 137 of temporary allocation information (joballocsummary), a structure 138 of job allocation information (joballoc), and a structure 139 of job allocation resource information (joballocrsinfo) are illustrated.

The structure 136 is an example of a structure of temporary allocation management information. The structure 136 includes the number of temporary allocation information (num_joballocsum) and a pointer to head temporary allocation information (joballocsummary *head_p). In the temporary allocation management information, the temporary allocation information representing the temporary allocation pattern regarding each job is managed. Single piece of temporary allocation information corresponds to a single temporary allocation pattern. The number of temporary allocation information is the number of temporary allocation information managed by the temporary allocation management information. The pointer to head temporary allocation information is a storage address on the RAM 103 of the head temporary allocation information. The temporary allocation management information is a single instance of the structure 136.

The structure 137 is an example of a structure of temporary allocation information. The structure 137 includes a pointer to next temporary allocation information (element) (joballocsummary *next_p), the number of allocated jobs (num_jids), an allocation start time (timespec alloc_start), an allocation end time (timespec alloc_end), a pointer to head job allocation information (joballoc *head_p), and a pointer to available resource information (availrsc *ar_p).

The pointer to next temporary allocation information indicates a storage address on the RAM 103 of the next temporary allocation information. In the temporary allocation information, the temporary allocation of the computing resources to the plurality of jobs may be managed. The number of allocated jobs is the number of jobs managed by the temporary allocation information. The allocation start time is the time (corresponding to an execution start time of the first job) at which the computing resource is allocated to the first job of the plurality of allocated jobs. The allocation end time is the time (corresponding to an execution start time of the last job) which is allocated to the last job of the plurality of jobs. The pointer to head job allocation information indicates a storage address on the RAM 103 of the head job allocation information regarding the temporarily allocated job. The available resource information is the available resource information regarding the computing resources used for the temporary allocation. The temporary allocation information is a single instance of the structure 137. The temporary allocation information may be prepared for each temporary allocation pattern using the structure 137.

The structure 138 is an example of a structure of job allocation information. The structure 138 includes a pointer to next job allocation information (joballoc *next_p), a job ID (jid), and job allocation resource information (joballocrsinfo ari).

The pointer to next job allocation information indicates a storage address on the RAM 103 of the next job allocation information. The job ID is a job ID of the temporarily allocated job. The job allocation resource information is the information regarding an allocation situation of the computing resources to the job indicated by the job ID. The job allocation information is a single instance of the structure 138. A plurality of job allocation information may be prepared using the structure 138.

The structure 139 is an example of a structure of job allocation resource information. The structure 139 includes a resource allocation start time (timespec start), a resource allocation end time (timespec end), the number of allocation resources (num_nids), and a pointer to allocation node ID (*nids_p).

The resource allocation start time is an allocation start time of the computing resources to the job of the job ID included in the job allocation information (execution of the job is started at the start time). The resource allocation end time is an allocation end time of the computing resources to the job of the job ID included in the job allocation information (execution of the job is completed at the end time). The number of allocation resources is the number of the allocated computation nodes. The allocation node ID is a computation node ID of the allocated computation node. The job allocation resource information is a single instance of the structure 139. A plurality of job allocation information may be prepared using the structure 139.

FIG. 15 is a diagram illustrating an example of temporary allocation of a job using the time t1 as a start point. In FIG. 15, an example of temporary allocation information corresponding to a pattern in which the jobs A, B, C, and D are temporarily allocated using the time t1 as a start point is illustrated.

The temporary allocation information includes the following information. The pointer next_p indicates the next temporary allocation information (illustration of the next temporary allocation information is omitted in FIG. 15). For example, respective pieces of temporary allocation information are connected in order of early in the allocation start time (alloc_start). The num_jids is "4". This is because the temporary allocation to four jobs A, B, C, and D is illustrated. The alloc_start is "t1". This is because the time t1 is the time (allocation start time) of the start point of the temporary allocation. The alloc_end is "t1+tA". This is because the execution start time of the job D of which execution is started last is the time t1+tA. The pointer head_p indicates the head job allocation information. The pointer ar_p indicates the available resource information used for the temporary allocation.

Figure 16:
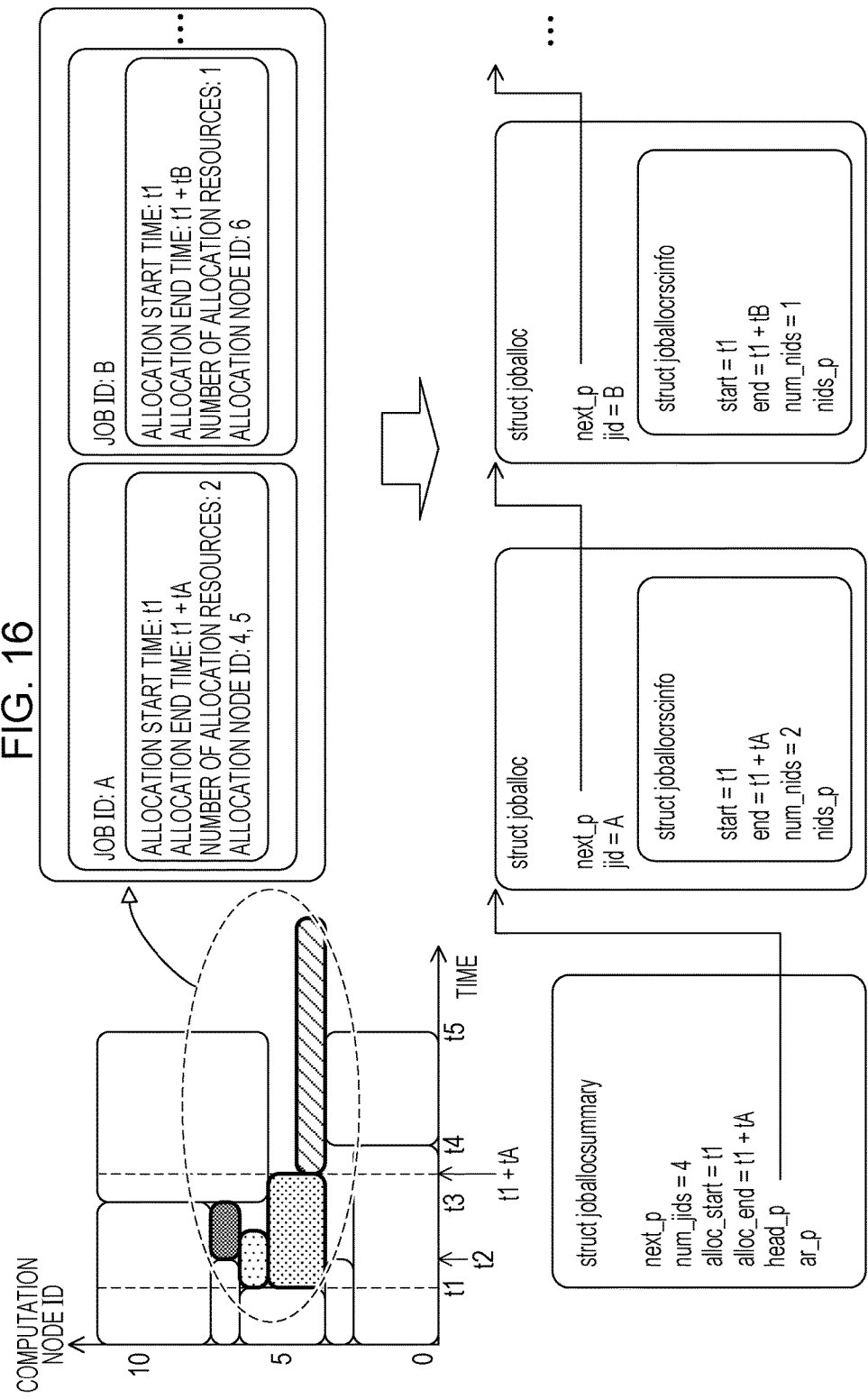
FIG. 16 is a diagram illustrating an example of managing a plurality of temporarily allocated jobs.

FIG. 16 is a diagram illustrating an example of managing a plurality of temporarily allocated jobs. For example, in the pattern in which the jobs A, B, C, and D are temporarily allocated using the time t1 as a start point, the contents of temporary allocation to each of the jobs are managed as described in the following. In this case, the job allocation information (a total of four job allocation information) is prepared using the structure 138 for each of the jobs A, B, C, and D. Respective pieces of job allocation information are connected to each other in descending order of job priority. However, in FIG. 16, illustration of the job allocation information of each of the jobs C and D is omitted.

As described above, the pointer head_p of the temporary allocation information indicates the head job allocation information. The priority of the job A is the highest among the jobs A, B, C, and D and thus, the head job allocation information is the job allocation information of the job A. The job allocation information of the job A includes next information. The pointer next_p indicates next job allocation information. A job having a priority second to that of the job A is the job B. For that reason, the next job allocation information of the job A is the job allocation information of the job B. The jid is the job ID ("A") of the job A.

The job allocation resource information of the job A includes next information. The start is "t1". The end is "t1+tA" (because the resource use time of the job A is tA).

Here, the t1+tA is an operation to obtain the time that has passed an amount of time tA from the time t1 (operations for other times are also similar). The num_nids is "2". This is because two computation nodes indicated by the computation node IDs "4" and "5" are allocated to the job A. The pointer nids_p indicates information of the computation node IDs "4" and "5".

The job allocation information of the job B includes next information. The pointer next_p indicates next allocation information. A job having a priority second to that of the job B is the job C. For that reason, the next job allocation information of the job B is the job allocation information of the job C. The jid is the job ID ("B") of the job B.

The job allocation resource information of the job B includes next information. The start is "t1". The end is "t1+tB" (because the resource use time of the job B is tB). The num_nids is "1". This is because one computation node indicated by the computation node ID "6" is allocated to the job B. The pointer nids_p indicates information of the computation node IDs "6".

The job allocation information of the job C also serves as information corresponding to the job C similar to the job allocation information of each of the jobs A and B. The job allocation information of the job D also serves as information corresponding to the job D similar to the job allocation information of each of the jobs A and B.

Figure 17:
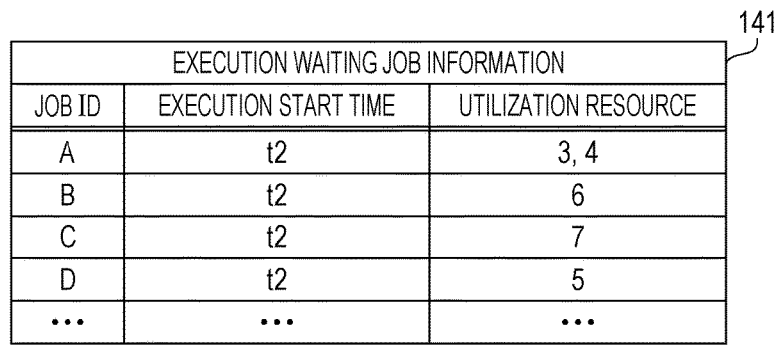
FIG. 17 is a diagram illustrating an example of execution waiting job information.

FIG. 17 is a diagram illustrating an example of execution waiting job information. The execution waiting job information 141 is stored in the execution waiting job storing unit 140. The execution waiting job information 141 includes information of a job ID, an execution start time, and a utilization resource.

In the item of the job ID, a job ID is registered. In the item of the execution start time, an execution start time is registered. In the item of utilization resource, the computation node ID of the computation node is registered. For example, information that the job ID is "A", the execution start time is "t2", and the utilization resources are "3" and "4" is registered in the execution waiting job information 141. The information indicates that the execution start time of the job A is the time t2 and the computation nodes used for the execution of the job A are two computation nodes indicated by the computation node IDs "3" and "4". The information of the execution start time and the utilization resource is registered in the execution waiting job information 141, similar to each of the jobs B, C, and D.

Figure 18:
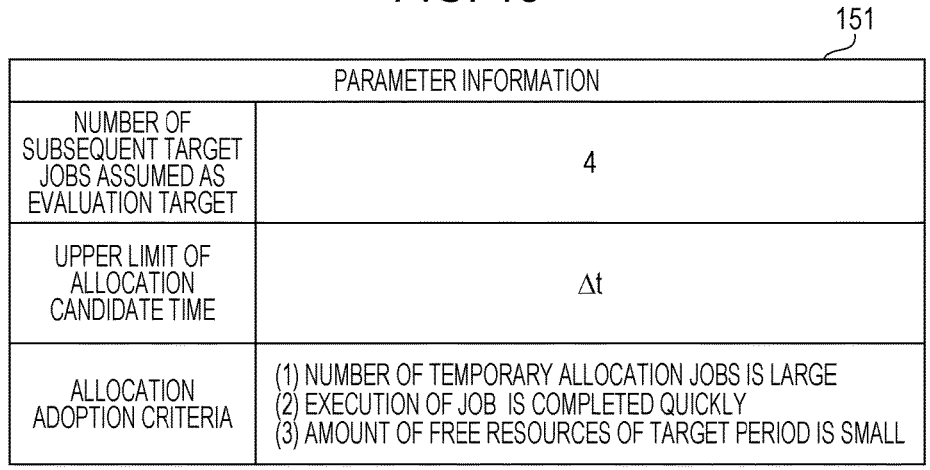
FIG. 18 is a diagram illustrating an example of parameter information.

FIG. 18 is a diagram illustrating an example of parameter information. The parameter information 151 is stored in the parameter storing unit 150. The parameter information 151 includes various information used when performing the job scheduling. Specifically, the parameter information 151 includes information of the number of subsequent target jobs assumed as an evaluation target, the upper limit of allocation candidate time, and the allocation adoption criteria.

The number of the subsequent target jobs assumed as the evaluation target is the number of the subsequent target jobs which are the temporary allocation target, for example, 4. The upper limit of the allocation candidate time is an upper limit of the allocation candidate time for the earliest allocation time, and is, for example, time Δt. In a case where the time t1 is the earliest allocation time, the upper limit of the allocation candidate time becomes time (t1+Δt) which corresponds to time that has passed from the time t1 by an amount of time Δt.

The allocation adoption criteria are criteria for selecting a pattern adopted in reality among the plurality of temporary allocation patterns of the computing resources for each job.

For example, the allocation adoption criteria include criteria such as (1) the number of jobs to be temporarily allocated is large, (2) the execution of the job is completed quickly, and (3) the amount of free resources of target period of time is small. The three criteria described above are assigned a priority. The adoption criteria of (1) have the highest priority. The adoption criteria of (2) have the second highest priority. The adoption criteria of (3) have the lowest priority. The adoption criteria may be any of the plurality of criteria. The criteria other than the adoption criteria described above may be adopted.

Figure 19:
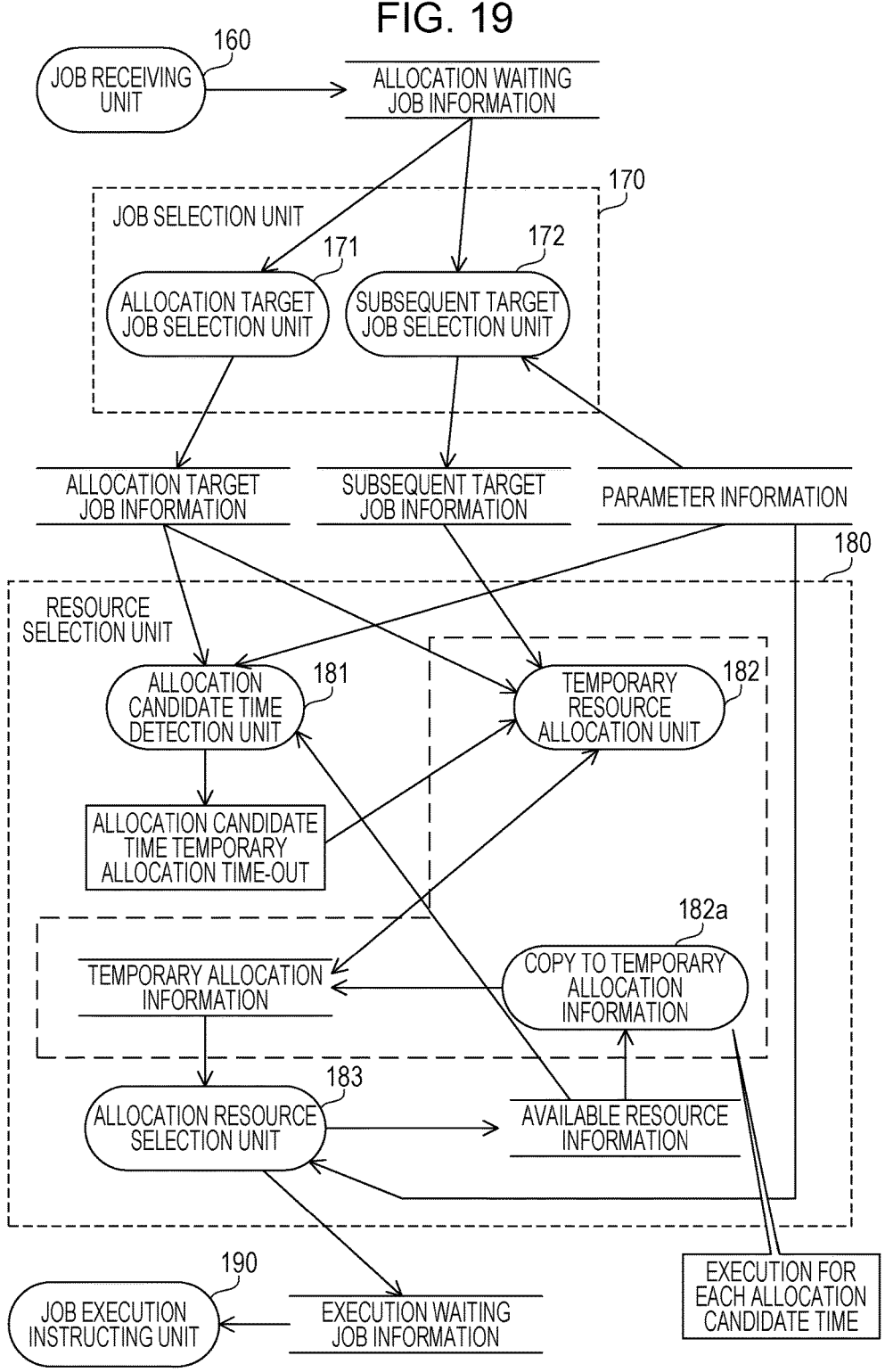
FIG. 19 is a diagram illustrating an example of a data flow of a management node.

FIG. 19 is a diagram illustrating an example of a data flow of a management node. In FIG. 19, a relationship between respective units illustrated in FIG. 4 and information referenced or updated by each unit is illustrated. Specifically, the job receiving unit 160 adds allocation waiting job information. The allocation target job selection unit 171 extracts the allocation target job information from the allocation waiting job information. The subsequent target job selection unit 172 extracts subsequent target job information from the allocation waiting job information based on the parameter information (the number of subsequent target jobs assumed as evaluation target). The allocation target job selection unit 171 specifies the last subsequent target job information extracted by the subsequent target job selection unit 172 as the tail job information (pointer to the tail job information in the allocation target job information is registered).

The allocation candidate time detection unit 181 obtains an allocation candidate time and a temporary allocation time-out based on the allocation target job information, parameter information (upper limit of the allocation candidate time) and available resource information. The allocation candidate time is a candidate of the time serving as a start point of the job allocation. The temporary allocation time-out is the time extending from the time at which the job having the highest priority may be allocated at the earliest to the upper limit of the allocation candidate time. For example, in a case where the time at which the job having the highest priority can be allocated at the earliest is the time t1, the temporary allocation time-out is the time t1+Δt. The allocation candidate time detection unit 181 selects the allocation candidate time between the t1 and the time t1+Δt.

The temporary resource allocation unit 182 performs the temporary allocation of the computing resources to each job based on the allocation target job information, the subsequent target job information, the allocation candidate time, the temporary allocation time-out, and the available resource information (included in the temporary allocation information) and updates the temporary allocation information. Here, the temporary resource allocation unit 182 copies the available resource information to the temporary allocation information accompanied by the temporary allocation (in FIG. 19, the copy processing is denoted by the reference numeral 182a as processing by the temporary resource allocation unit 182). This is performed in order not to directly update current available resource information accompanied with the temporary allocation.

The allocation resource selection unit 183 refers to the temporary allocation information and the parameter information (allocation adoption criteria) to select the temporary allocation pattern to be adopted from among a plurality of temporary allocation patterns. The allocation resource selection unit 183 updates the available resource information and the execution waiting job information according to the adopted temporary allocation pattern (contents of the temporary allocation pattern are reflected in the actual scheduling).

The job execution instructing unit 190 instructs each computation node to execute the job based on the execution waiting job information.

Next, description will be made on a procedural sequence of processing by the management node 100. In the meantime, it is assumed that the allocation target job selection unit 171 and the subsequent target job selection unit 172 have prepared the allocation target job information and the subsequent target job information.

Figure 20:
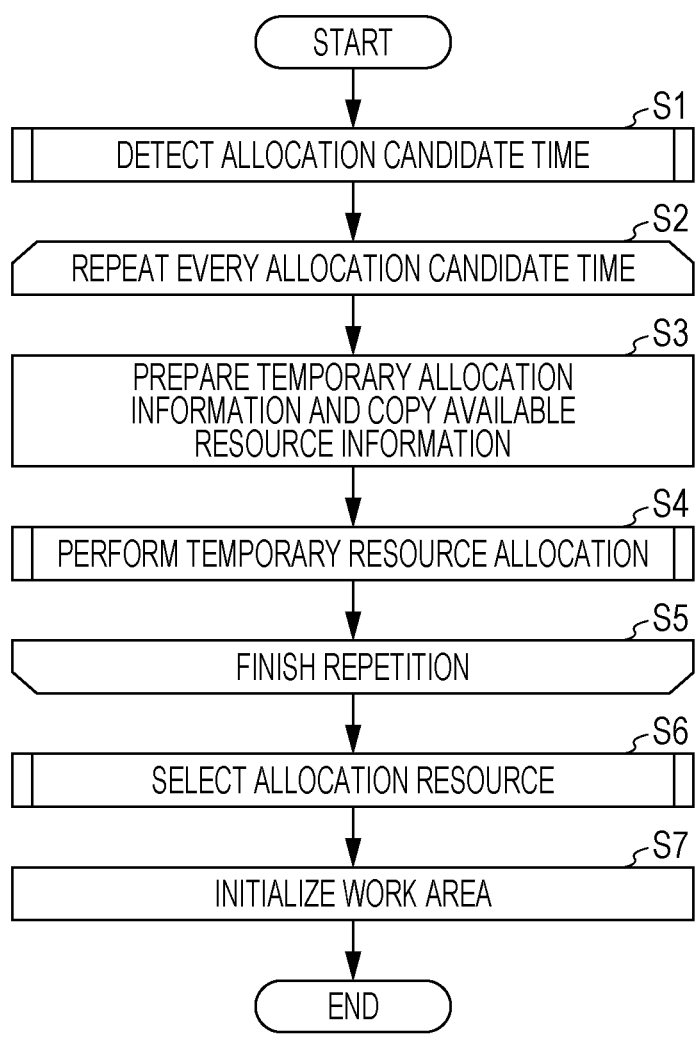
FIG. 20 is a diagram illustrating an example of a process performed by the management node.

FIG. 20 is a diagram illustrating an example of a process performed by the management node. In the following, a process illustrated in FIG. 20 will be described along with step numbers.

(S1) The allocation candidate time detection unit 181 detects a plurality of allocation candidate times. The allocation candidate time detection unit 181 obtains temporary allocation time-out. As described above, the temporary allocation time-out is the time obtained by adding the upper limit time Δt of allocation candidate time to the earliest allocation candidate time. Details of the process will be described later.

(S2) The temporary resource allocation unit 182 selects the allocation candidate times one by one from the head allocation candidate time (the earliest time) to the tail allocation candidate time (the latest time) and repeats Steps S3 and S4.

(S3) The temporary resource allocation unit 182 prepares the temporary allocation information regarding the selected allocation candidate time and stores the allocation candidate information in the resource information storing unit 130. The temporary resource allocation unit 182 copies the available resource information used for the temporary allocation process and adds the available resource information to the temporary allocation information. The copied available resource information is stored in a predetermined work area of the resource information storing unit 130. Thereafter, the copied available resource information is referenced and accompanied by the temporary allocation regarding the selected allocation candidate time (copied available resource information may be updated).

(S4) The temporary resource allocation unit 182 performs temporary resource allocation in a period of time from the selected allocation candidate time to the temporary allocation time-out, and adds the result to the temporary allocation information. Details of the process will be described later.

(S5) When the processing of Steps S3 and S4 is completed for all of the plurality of allocation candidate times, the temporary resource allocation unit 182 causes the process to proceed to Step S6. Step S4 is executed such that a single temporary allocation pattern is prepared for a single allocation candidate time. Step S4 is repeatedly executed for each single allocation candidate time such that a plurality of temporary allocation patterns are prepared.

(S6) The allocation resource selection unit 183 compares the prepared plurality of temporary allocation patterns with each other to select a single temporary allocation pattern. The allocation resource selection unit 183 performs the selection of the temporary allocation pattern based on the allocation adoption criteria included in the parameter information 151.

Figure 21:
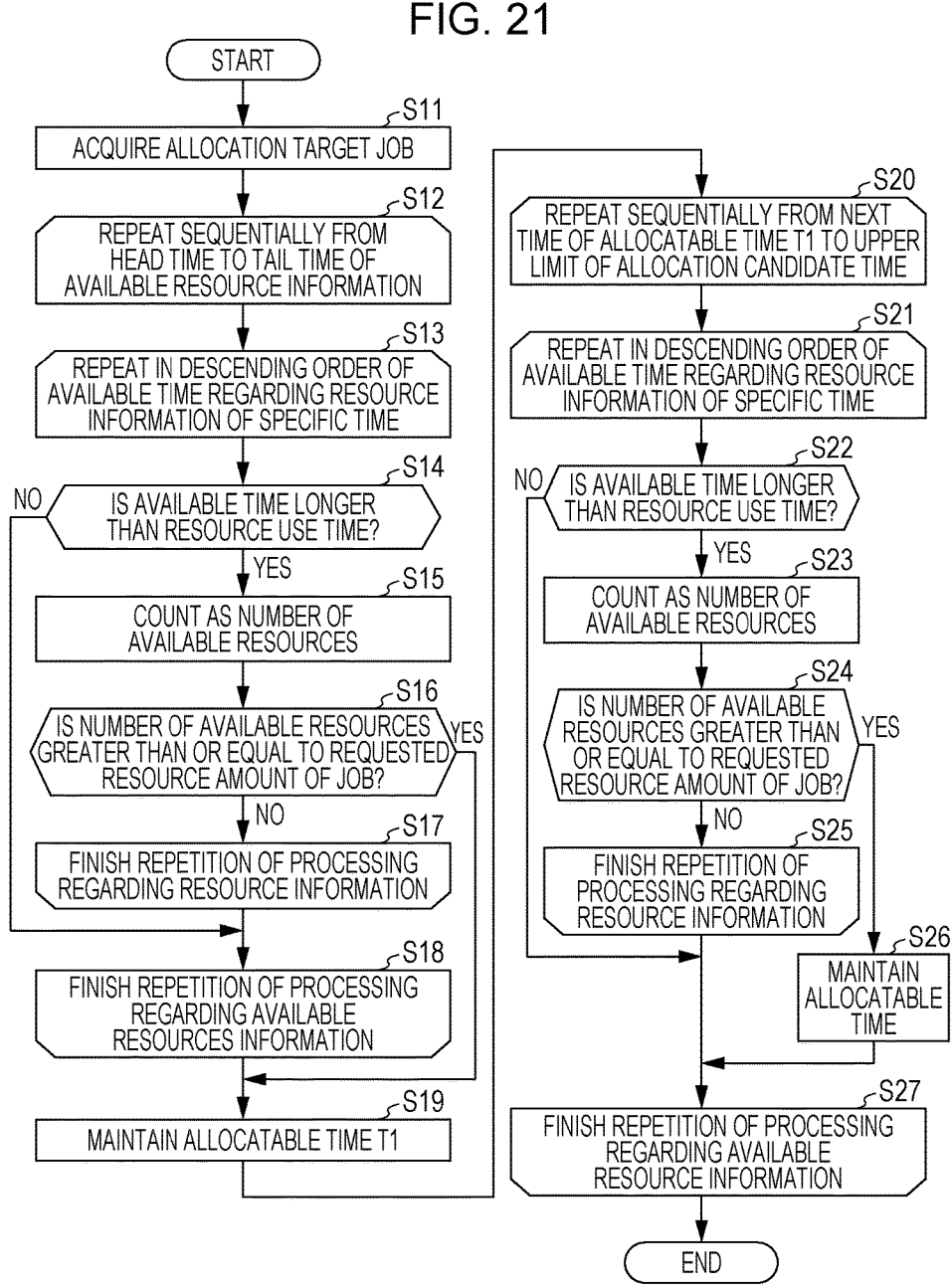
FIG. 21 is a flow chart illustrating an example of detecting an allocation candidate time.

(S7) The temporary resource allocation unit 182 initializes the work area secured using the temporary resource allocation. FIG. 21 is a flow chart illustrating an example of the allocation candidate time detection. In the following, a process illustrated in FIG. 21 will be described along with step numbers. The following procedural sequences correspond to Step S1 of FIG. 20.

(S11) The allocation candidate time detection unit 181 acquires the head job (job having the highest priority) from the allocation target job information and the subsequent target job information (list of struct schedjobinfo.head_p) sorted in order of scheduling priority. The allocation candidate time detection unit 181 regards the number of available resources to the head job as 0.

(S12) The allocation candidate time detection unit 181 retrieves the earliest time at which the head job is allocatable by the procedural sequences up to Step S18. For that reason, the allocation candidate time detection unit 181 selects the times (struct availrsc.time) one by one from the head time to the tail time of a plurality of available resource information (list of struct availrschead.head_p) and repeatedly executes Steps S13 to S17. Here, the selected time is referred to as a "specific time" in Steps S13 to S19.

(S13) The allocation candidate time detection unit 181 selects the available times (struct availrscinfo.availtime) one by one in descending order of length of the available time from a plurality of resource information (list of struct availrsc.arihead_p) in the specific time and repeatedly executes Steps S14 to S16. In the list of struct availrsc.arihead_p, respective pieces of resource information are sorted in descending order of length of the available time (struct availrscinfo.availtime).

(S14) The allocation candidate time detection unit 181 determines whether the selected available time for the resource information is longer than the resource use time of the head job or not. In a case where the available time is longer than the resource use time, the process is caused to proceed to Step S15. In a case where the available time is not longer than the resource use time, the process is caused to proceed to Step S18. The determination is performed by comparing the available time (struct availrscinfo.availtime) of the resource information with the resource use time (struct jobinfo.reqtime) of the job information. In a case where the determination result in Step S14 is No, it is not possible to find out the time allocatable to the head job from the available resource information of current interest, and thus, the process proceeds to Step S18 and searches the allocatable time from the next available resource information.

(S15) The allocation candidate time detection unit 181 determines that the computing resource of interest is available for executing the head job and counts the computing resource as the number of available resources (adds value of struct availrscinfo.num_nids to number of available resources).

(S16) The allocation candidate time detection unit 181 determines whether the counted number of available resources for the head job is equal to or greater than the requested resource amount of the head job. In a case where the number of available resources is equal to or greater than the requested resource amount, the process proceeds to Step S19. In a case where the number of available resources is not equal to or greater than the requested resource amount, the process proceeds to Step S17. The determination is performed by comparing the number of available resources for the head job with a requested resource amount (struct jobinfo.num_reqnids) of the job information.

(S17) When the processing regarding all resource information is ended in the specific time, the allocation candidate time detection unit 181 causes the process to proceed to Step S18. In a case where the process proceeds to Step S18, the allocation candidate time detection unit 181 resets the number of available resources for the head job to 0. The case where the process proceeds to Step S18 means that the time allocatable to the head job is not able to be obtained in the available resource information of current interest.

(S18) In general, the allocation candidate time detection unit 181 repeatedly executes Steps S13 to S17 while referencing respective pieces of available resource information in order and thus, the allocation candidate time detection unit 181 comes out from a loop by Step S16 in any of the timings. However, in a case where it is not possible to detect the allocation candidate time for the head job even when all available resource information able to be searched is processed, the allocation candidate time detection unit 181 may output error information and end the detection process of the allocation candidate time.

(S19) The allocation candidate time detection unit 181 determines that the head job is able to be allocated to the specific time of current interest (struct availrsc.time) and maintains the specific time in the RAM 103 as the allocatable time T1. In the example of the second embodiment, the allocatable time T1=t1. The allocation candidate time detection unit 181 resets the number of available resources for the head job to 0.

(S20) The allocation candidate time detection unit 181 retrieves the time which is later than the time T1 and at which the head job is able to be allocated by procedural sequences up to Step S25. For that reason, the allocation candidate time detection unit 181 selects the times (struct availrsc.time) one by one from the time T1 of a plurality of available resource information (list of struct availrschead.head_p) to the upper limit of allocation candidate time (=temporary allocation time-out T1+Δt) and repeatedly executes Steps S21 to S24. Here, the selected time is referred to as a "specific time" in Steps S21 to S26.

(S21) The allocation candidate time detection unit 181 selects the available times one by one in descending order of length of the available time (availtime) from a plurality of resource information (list of struct availrsc.arihead_p) in the specific time and repeatedly executes Steps S22 to S24. In the list of struct availrsc.arihead_p, respective pieces of resource information are sorted in descending order of length of the available time (struct availrscinfo.availtime).

(S22) The allocation candidate time detection unit 181 determines whether the selected available time for the resource information is longer than the resource use time of the head job or not. In a case where the available time is longer than the resource use time, the process is caused to proceed to Step S23. In a case where the available time is not longer than the resource use time, the process is caused to proceed to Step S27. The determination is similar to Step S14.

(S23) The allocation candidate time detection unit 181 determines that the computing resource of interest is available for the head job and counts the computing resource as the number of available resources (adds value of struct availrscinfo.num_nids to number of available resources).

(S24) The allocation candidate time detection unit 181 determines whether the counted number of available resources for the head job is equal to or greater than the requested resource amount of the head job. In a case where the number of available resources is equal to or greater than the requested resource amount, the process proceeds to Step S26. In a case where the number of available resources is not equal to or greater than the requested resource amount, the process proceeds to Step S25. The determination is similar to Step S16.

(S25) When the processing regarding all resource information is ended in the specific time, the allocation candidate time detection unit 181 causes the process to proceed to Step S27. In a case where the process proceeds to Step S27, the allocation candidate time detection unit 181 resets the number of available resources for the head job to 0. The case where the process proceeds to Step S27 means that the time allocatable to the head job is not able to be obtained in the available resource information of current interest.

(S26) The allocation candidate time detection unit 181 determines that the head job is able to be allocated to the specific time of interest (struct availrsc.time) and maintains the specific time in the RAM 103 as the allocatable time. The process proceeds to Step S27.

(S27) When the processing is ended for all available resource information at the time later than the allocatable time T1, the allocation candidate time detection unit 181 ends the allocation candidate time detection process. In this stage, the allocatable time maintained in the RAM 103 is an allocation candidate time. For example, the allocation candidate time detection unit 181 detects the times t2, t3, and t4 as the allocation candidate time later than the time t1 with respect to the allocatable time T1=t1 by the procedural sequences S20 to S27.

Figure 22:
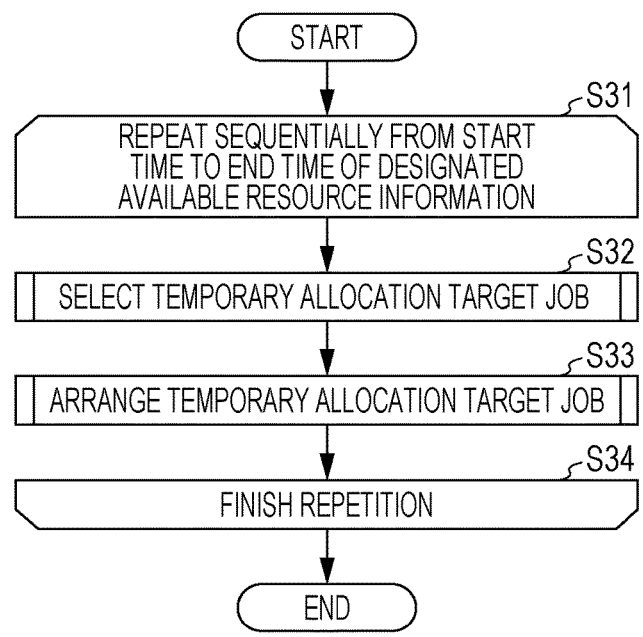
FIG. 22 is a flow chart illustrating an example of a temporary resource allocation.

FIG. 22 is a flow chart illustrating an example of temporary resource allocation. In the following, a process illustrated in FIG. 22 will be described along with step numbers. The following procedural sequences described above correspond to Step S4 of FIG. 20.

(S31) The temporary resource allocation unit 182 acquires the available resource information (designated available resource information) corresponding to the allocation candidate time of interest. The temporary resource allocation unit 182 selects the available resource information corresponding to each time (struct availrsc.time) from the start time to the end time one by one among the plurality of available resource information using the designated available resource information as the start point and performs the process in order of Step S32 and Step S33. The start time corresponds to the allocation candidate time of interest. The end time corresponds to the latest time that does not exceed the temporary allocation time-out among the time (struct availrsc.time) included in the plurality of available resource information. Here, the time of the available resource information selected in Step S31 is referred to as a "specific time" in Steps S32 and S33.

(S32) The temporary resource allocation unit 182 selects all of the jobs allocatable for the specific time (temporary allocation target job). Specifically, the temporary resource allocation unit 182 refers to the available resource information of the specific time from the allocation target job information and the subsequent target job information, selects the allocatable job, and maintains the allocatable job in the RAM 103 as the temporary allocation target job. Details of the process will be described later.

(S33) The temporary resource allocation unit 182 performs the temporary allocation (placing on the temporary allocation target job on the time map) of the computing resources to the temporary allocation target job based on the temporary allocation target job and the temporary allocation information. The temporary resource allocation unit 182 reflects the temporary allocation result in the temporary allocation information. Details of the process will be described later.

(S34) When the selection of the temporary allocation target job and the placing of the temporary allocation target job regarding each time from the start time to the end time are executed, the temporary resource allocation unit 182 ends the temporary resource allocation process which uses the allocation candidate time of interest as the start point.

Figure 23:
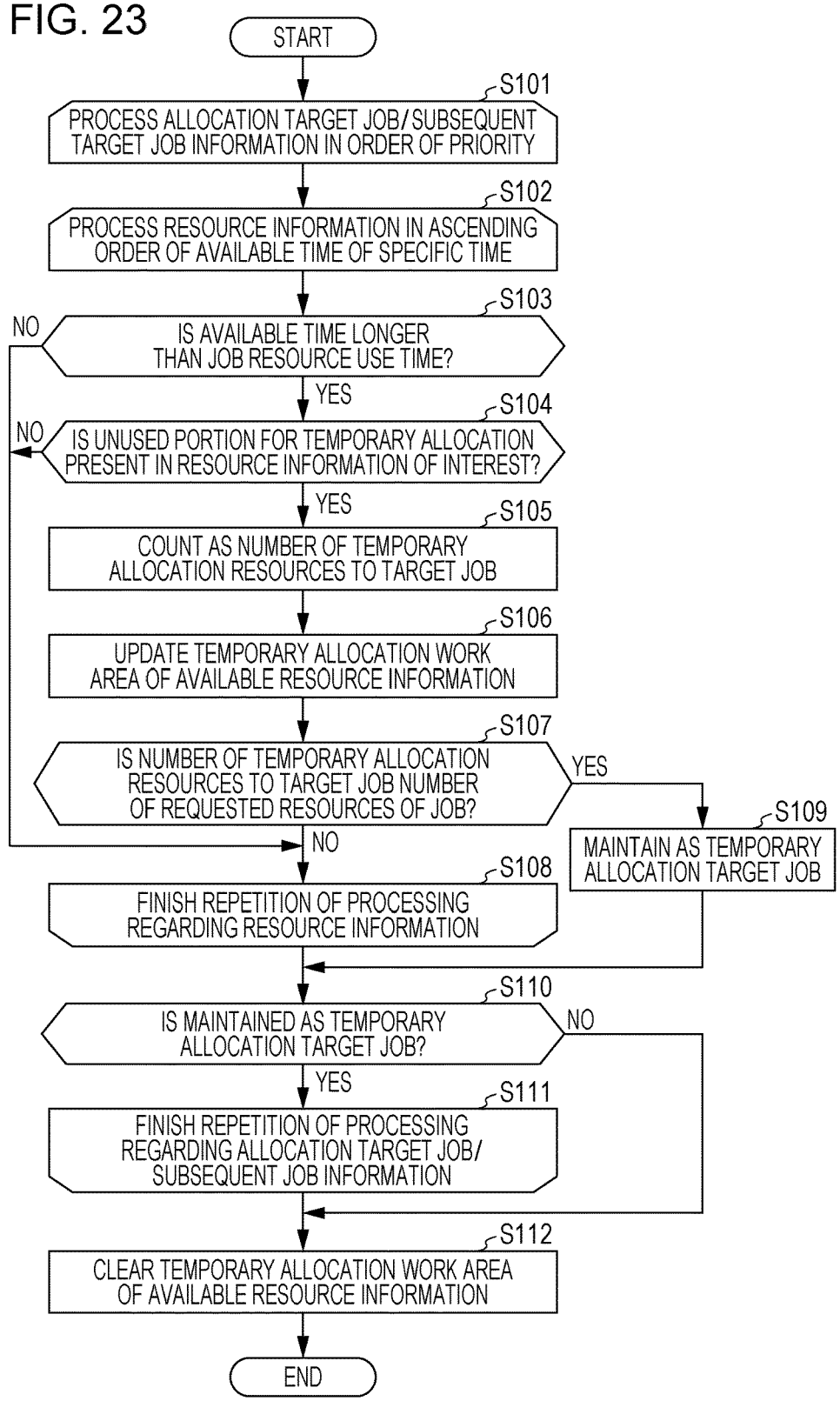
FIG. 23 is a flow chart illustrating an example of selecting a temporary allocation target job.

FIG. 23 is a flow chart illustrating an example of selecting a temporary allocation target job. In the following, a process illustrated in FIG. 23 will be described along with step numbers. The following procedural sequences described above correspond to Step S32 of FIG. 22.

(S101) The temporary resource allocation unit 182 processes the allocation target job information and the subsequent target job information in order of priority. Specifically, the temporary resource allocation unit 182 selects the subsequent target job information one by one from the plurality of pieces of subsequent target job information indicated by the allocation target job information in descending order of priority, and repeatedly executes Steps S102 to S110. Respective pieces of subsequent target job information are connected to each other in descending order of priority (list of struct schedjobinfo.head_p). Here, the job corresponding to the selected subsequent target job information is referred to as a "target job" in Steps S102 to S110. The temporary resource allocation unit 182 regards the number of the temporary allocation resources for the target job as 0.

(S102) The temporary resource allocation unit 182 processes the resource information in ascending order of length of available time of specific time. Specifically, the temporary resource allocation unit 182 selects the resource information one by one in ascending order of length of available time (list of struct availrsc.aritail_p) among the plurality of the resource information in the specific time and repeatedly executes Steps S103 to S107.

(S103) The temporary resource allocation unit 182 determines whether the available time of the resource information of interest (struct availrscinfo.availtime) is longer than the resource use time of the subsequent target job information of interest (struct jobinfo.reqtime) or not. In a case where the available time is longer than the resource use time, the process proceeds to Step S104. In a case where the available time is not longer than the resource use time, the process proceeds to Step S108.

(S104) The temporary resource allocation unit 182 determines whether an unused portion for temporary allocation is present in resource information of interest or not. In a case where the unused portion is present, the process proceeds to Step S105. In a case where the unused portion is not present, the process proceeds to Step S108. Here, the determination in Step S104 is performed by comparing the total number of temporary allocation nodes (struct allocrscinfo.total_alloc_nids) of temporary allocation work information included in the resource information with the number of available nodes (struct availrscinfo.num_nids) of the resource information. If the total number of temporary allocation nodes is smaller than the number of available nodes, not all the computing resources are used for the temporary allocation and unused computing resources remain. On the other hand, if the total number of temporary allocation nodes is equal to the number of available nodes, all the computing resources have been used for the temporary allocation and the unused computing resources do not remain.

(S105) The temporary resource allocation unit 182 counts the computing resources of interest as the number of temporary allocation resources to the target job. Specifically, the counted number added to the number of temporary allocation resources is min (number of available resources−number of temporarily allocated resources, number of requested resources of target job−number of counted temporary allocation resources). Here, an operation min (x, y) corresponds to an operation to select the smaller one of x and y. The number of temporarily allocated resources is a value of the struct allocrscinfo.total_alloc_nids of the resource information of interest.

(S106) The temporary resource allocation unit 182 updates a temporary allocation work area of available resource information. Specifically, the temporary resource allocation unit 182 adds the number of temporary allocation resources counted in Step S105 to the number of all temporary allocation nodes (struct allocinfo.total_alloc_nids) of the temporary allocation work area (struct availrscinfo.allocinfo) of the resource information of interest. With this, the computing resource temporarily allocated to the target job is managed as the used computing resource.

(S107) The temporary resource allocation unit 182 determines whether the number of temporary allocation resources to the target job is equal to the number of requested resources of target job or not. In a case where the number of temporary allocation resources is equal to the number of requested resources, the process proceeds to Step S109 (come out of loop). In a case where the number of temporary allocation resources is not equal to the number of requested resources, the process proceeds to Step S108. The determination is performed by confirming whether the number of temporary allocation resources counted in Step S105 reaches the number of requested resources of target job (struct jobinfo.num_reqnids) or not.

(S108) When the processing regarding all resource information is ended in the specific time, the temporary resource allocation unit 182 causes the process to proceed to Step S110.

(S109) The temporary resource allocation unit 182 maintains information regarding the target job as the temporary allocation target job. Specifically, temporary resource allocation unit 182 maintains the temporary allocation target job corresponding to the target job on the RAM 103. The temporary allocation target job information includes information similar to subsequent target job information. The processing of Step S109 is repeatedly executed, and thus a plurality of temporary allocation target job information indicating a plurality of temporary allocation target jobs may be maintained. In this case, the temporary resource allocation unit 182 sorts the temporary allocation target job information in descending order of job resource use time (struct jobinfo.reqtime). The process proceeds to Step S110.

(S110) The temporary resource allocation unit 182 determines whether the current target job is maintained as the temporary allocation target job or not. In a case where the current target job is maintained as the temporary allocation target job, the process proceeds to Step S111. In a case where the current target job is not maintained as the temporary allocation target job, the process proceeds to Step S112 (come out of loop). In a case where the target job is not maintained as the temporary allocation target job, the reason why the temporary allocation for the next job is not performed (proceeding to Step S112) is to cause the job having a low schedule priority not to be executed ahead of the job having a high schedule priority.

(S111) When all the processing regarding subsequent target jobs is completed, the temporary resource allocation unit 182 causes the process to proceed to Step S112.

(S112) The temporary resource allocation unit 182 clears the temporary allocation work area of the available resource information. Specifically, when saving of all temporary allocation target jobs for the specific time is completed, the temporary resource allocation unit 182 clears the temporary allocation work area (struct availrscinfo.allocinfo) of the resource information of interest.

Figure 24:
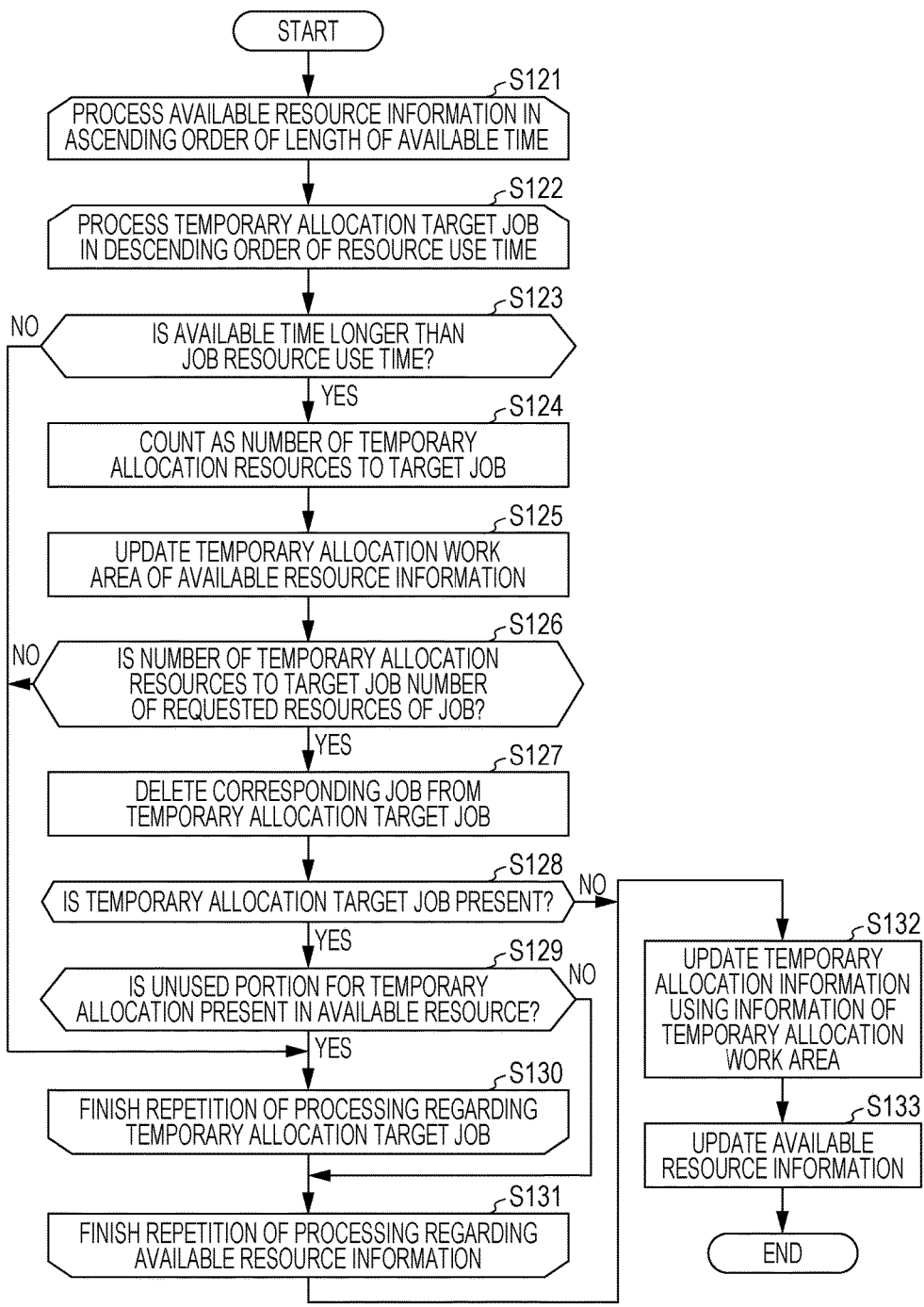
FIG. 24 is a flow chart illustrating an example of placing the temporary allocation target job.

FIG. 24 is a flow chart illustrating an example of placing the temporary allocation target job. In the following, a process illustrated in FIG. 24 will be described along with step numbers. The following procedural sequences correspond to Step S33 of FIG. 22.

(S121) The temporary resource allocation unit 182 processes the available resource information in ascending order of length of available time corresponding to the specific time. Specifically, the temporary resource allocation unit 182 selects the resource information one by one from a plurality of resource information indicated in the available resource information in ascending order of length of available time (list of struct availrsc.aritail_p) and repeatedly executes Steps S122 to S130. The computing resources of which the available time is shorter are used first and thus, the amount of free time of the computing resources may be reduced.

(S122) The temporary resource allocation unit 182 processes the maintained temporary allocation target jobs in descending order of the resource use time. Specifically, the temporary resource allocation unit 182 selects the temporary allocation target job information maintained on the RAM 103 one by one and repeatedly executes Steps S123 to S129. Here, the temporary allocation target job corresponding to the selected temporary allocation target job information is referred to as a "target job" in Steps S123 to S129. The temporary resource allocation unit 182 regards the number of temporary allocation resources for the target job as 0.

(S123) The temporary resource allocation unit 182 determines whether the available time (struct availrscinfo.availtime) included in the resource information of interest is longer than the resource use time of the target job (struct jobinfo.reqtime) or not. In a case where the available time is longer than the resource use time, the process proceeds to Step S124. In a case where the available time is not longer than the resource use time, the process proceeds to Step S130.

(S124) The temporary resource allocation unit 182 counts the computing resources of interest as the number of temporary allocation resources to the target job. Specifically, the counted number added to the number of temporary allocation resources is min (number of available resources−number of temporarily allocated resources, number of requested resources of target job−number of counted temporary allocation resources). The number of temporarily allocated resources is a value of the struct allocrscinfo.total_alloc_nids of the resource information of interest.

(S125) The temporary resource allocation unit 182 updates a temporary allocation work area of available resource information. Specifically, the temporary resource allocation unit 182 adds the number of temporary allocation resources counted in Step S124 to the number of all temporary allocation nodes (struct allocrscinfo.total_alloc_nids) of the temporary allocation work area (struct availrscinfo.allocinfo) of the resource information of interest. With this, the computing resources temporarily allocated to the target job are managed as a used computing resource. The temporary resource allocation unit 182 prepares for the processing performed after Step S132 and also reflects the job ID using the computing resources and an amount of used resources (number of acquired resources) in the temporary allocation work area (corresponding to information of structure 135).

(S126) The temporary resource allocation unit 182 determines whether the number of temporary allocation resources to the target job is equal to the number of requested resources of target job or not. In a case where the number of temporary allocation resources is equal to the number of requested resources, the process proceeds to Step S127. In a case where the number of temporary allocation resources is not equal to the number of requested resources, the process proceeds to Step S130. The determination is performed by confirming whether the counted number of temporary allocation resources reaches the number of requested resources of target job (struct jobinfo.num_reqnids) or not.

(S127) The temporary resource allocation unit 182 deletes the target job of current interest (corresponding job) from the temporary allocation target jobs. Specifically, the temporary resource allocation unit 182 deletes the temporary allocation target job information corresponding to the temporary allocation target job of current interest among the plurality of temporary allocation target job information maintained on the RAM 103.

(S128) The temporary resource allocation unit 182 determines whether the temporary allocation target job is present. In a case where the temporary allocation target job is present, the process proceeds to Step S129. In a case where the temporary allocation target job is not present, the process proceeds to Step S132. Specifically, in a case where the temporary allocation target job information maintained on the RAM 103 remains, the temporary allocation target job is present. On the other hand, in a case where all of the plurality of temporary allocation target job information maintained on the RAM 103 are deleted by repeated executions of Step S127, the temporary allocation target job is not present.

(S129) The temporary resource allocation unit 182 confirms the temporary allocation work area (struct availrscinfo.allocinfo) of the available resource information and determines whether the portion unused for the temporary allocation is present in the available resource of interest. In a case where the unused portion is present, the process proceeds to Step S130. In a case where the unused portion is not present, that is, all portions of the work are used for the temporary allocation, the process proceeds to Step S131. Specifically, in a case where the total number of temporary allocation nodes (struct allocrscinfo.total_alloc_nids) is smaller than the number of available nodes (struct availrscinfo.num_nids) of the resource information in the temporary allocation work area of the resource information of interest, the portion unused for the temporary allocation is present. On the other hand, in a case where the total number of temporary allocation nodes is equal to the number of available nodes, all the corresponding resource information has been used for the temporary allocation (moving to processing of next resource information).

(S130) The temporary resource allocation unit 182 moves to processing for the next temporary allocation target job (proceeding to Step S122). In a case where the processing regarding all the temporary allocation target jobs is finished, the temporary resource allocation unit 182 causes the process to proceed to Step S131.

(S131) The temporary resource allocation unit 182 moves to processing for the next resource information (proceeding to Step S121). In a case where although the temporary allocation target job remains, the resource information to determine an allocation destination is not present, the temporary resource allocation unit 182 may output an error and end the processing.

(S132) The temporary resource allocation unit 182 updates the temporary allocation information (struct jobaallocsummary) based on information of the temporary allocation work area (temporary allocation work information).

(S133) The temporary resource allocation unit 182 updates the available resource information based on the temporary allocation information. Specifically, the temporary resource allocation unit 182 updates the available resource information from the temporary allocation information updated in Step S132 in order to perform the processing after the next time. The update described in Step S3 of FIG. 20 is performed for the copied available resource information. The temporary resource allocation unit 182 may prepare available resource information for a new time according to a temporary allocation situation of the temporary allocation target job. For example, in a case where a first half of available time regarding existing resource information is used for the temporary allocation and the latter half is unused for the temporary allocation, the temporary resource allocation unit 182 prepares new available resource information for the start time of the latter half.

Figure 25:
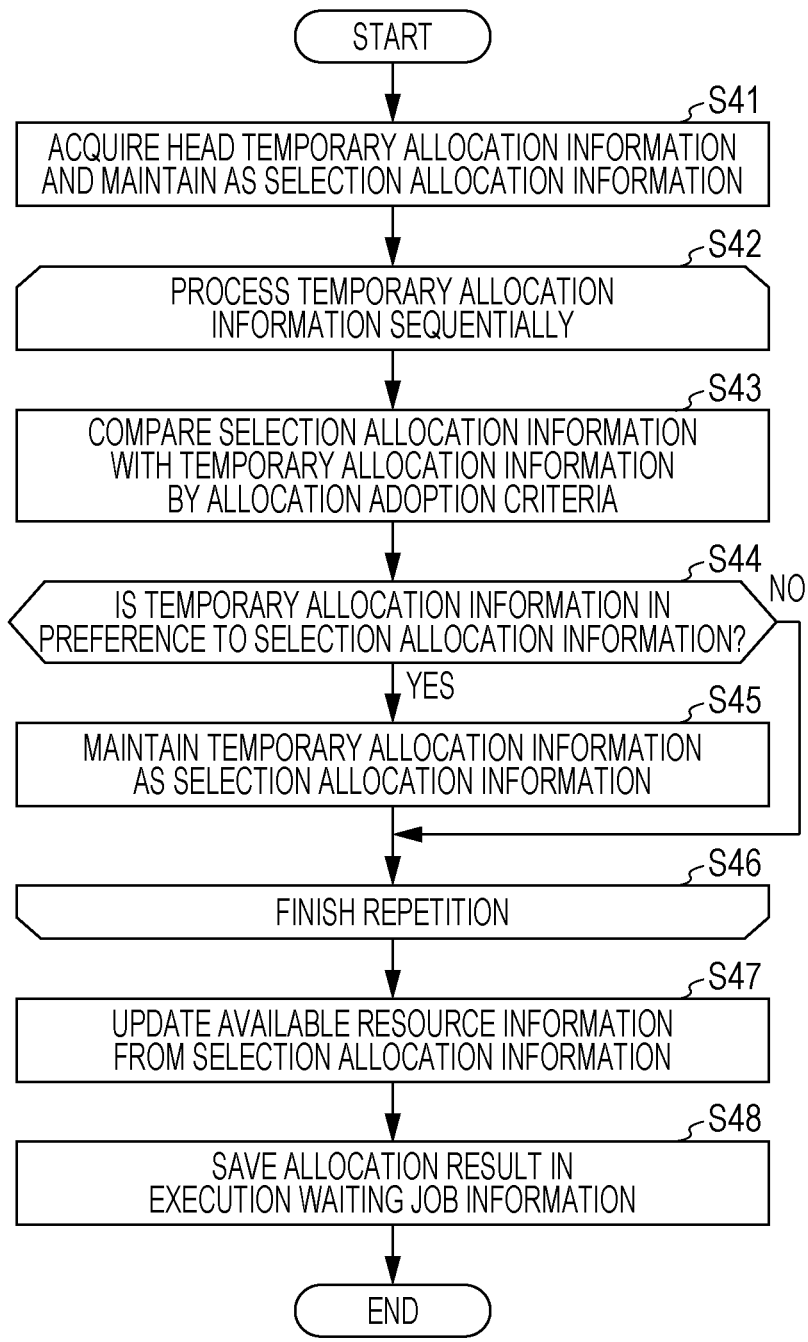
FIG. 25 is a flow chart illustrating an example of selecting an allocation resource.

FIG. 25 is a flow chart illustrating an example of selecting an allocation resource. In the following, a process illustrated in FIG. 25 will be described along with step numbers. The following procedural sequences correspond to Step S6 of FIG. 20.

(S41) The allocation resource selection unit 183 obtains the head temporary allocation information and maintains the information as selection allocation information. Specifically, the allocation resource selection unit 183 extracts the head temporary allocation information first and maintains the head temporary allocation information (struct joballocsummaryhead.head_p) on the RAM 103 as the selection allocation information in order to compare all the temporary allocation information.

(S42) The allocation resource selection unit 183 processes the temporary allocation information in order. Specifically, the allocation resource selection unit 183 selects the temporary allocation information (list of struct joballocsummaryhead.head_p) one by one except for the head temporary allocation information and repeatedly executes Steps S43 to S45. Here, the selected temporary allocation information is referred to as "temporary allocation information of interest" in the following steps 42.

(S43) The allocation resource selection unit 183 compares the selection allocation information with temporary allocation information of interest based on the allocation adoption criteria included in the parameter information 151.

(S44) The allocation resource selection unit 183 determines whether the temporary allocation information of interest has a preference over the selection allocation information according to the adoption criteria. In a case where the temporary allocation information of interest has a preference over the selection allocation information, the process proceeds to Step S45. In a case where the temporary allocation information of interest does not have a preference over the selection allocation information, the process proceeds to Step S46. For example, the allocation adoption criteria of the parameter information 151 indicate that the following have preference over other information: (1) the number of allocated jobs is large; (2) the execution of the job is completed quickly; and (3) the amount of free resources of target period of time is small. That is, the allocation resource selection unit 183 gives preference to the resource having a larger number of jobs temporarily allocated over other resources. In a case where the numbers of allocated jobs are equal to each other, the resource in which executions of all jobs are completed earlier has a preference over other resources. In a case where the execution completion times for all the jobs are equal, the resource having a small amount of free resources during a target period of time (a period of time extending to the execution completion time) has a preference over other resources. The amount of free resources is indicated as a product of a node and time of the free resource in the period of time.

(S45) The allocation resource selection unit 183 maintains the temporary allocation information of interest as the selection allocation information. That is, the allocation resource selection unit 183 maintains the temporary allocation information of interest as the selection allocation information, instead of the current selection allocation information.

(S46) When all temporary allocation information is processed, the allocation resource selection unit 183 causes the process to proceed to Step S47.

(S47) The allocation resource selection unit 183 updates the available resource information from the selection allocation information. Specifically, the allocation resource selection unit 183 updates the available resource information (struct availrschead.head_p) based on the temporary allocation pattern (selection allocation information) to be handled as having a preference over all other temporary allocation patterns. Here, the available resource information of an update destination is not the available resource information copied in Step S3 but the available resource information of a copy source. That is, the contents of the decided allocation pattern from among a plurality of temporary allocation patterns are reflected into the available resource information to be currently produced.

(S48) The allocation resource selection unit 183 saves the allocation result in the execution waiting job information. Specifically, the allocation resource selection unit 183 adds an execution schedule of the job to the execution waiting job information according to the decided allocation pattern.

By doing this, the management node 100 prepares a plurality of temporary allocation patterns and selects a temporary allocation pattern which best matches the adoption criteria from among the plurality of temporary allocation patterns. A predetermined period of time of the adoption criteria may be a period of time extending up to the upper limit of the allocation candidate time and may be designated as a period of time different from the period of time extending to the upper limit of the allocation candidate time in advance.

Next, description will be made on a specific example of allocation of the computing resources to jobs A, B, C, and D by the management node 100.

Figure 26:
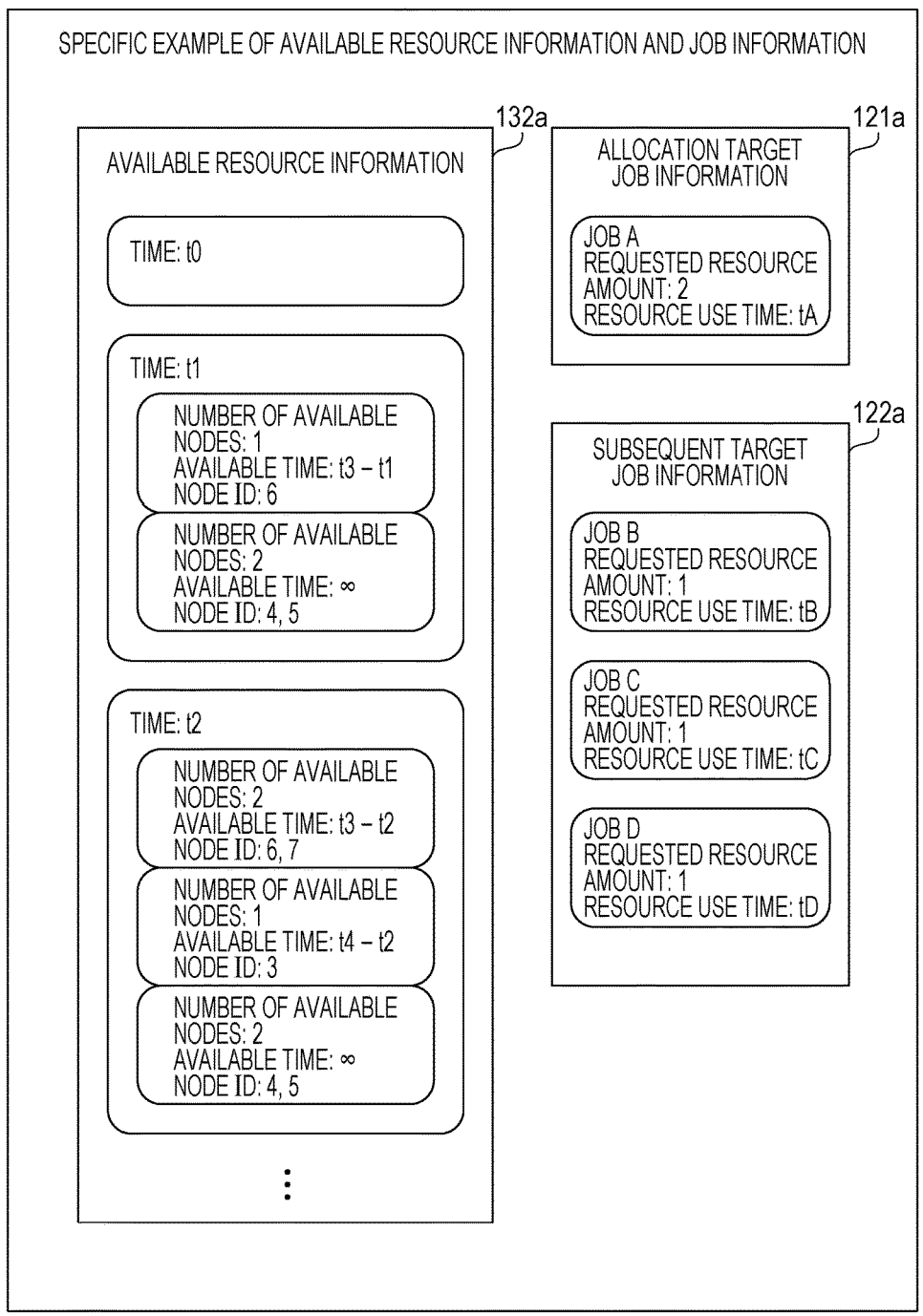
FIG. 26 is a diagram illustrating a specific example of available resource information and job information.

FIG. 26 is a diagram illustrating a specific example of available resource information and job information. First, as illustrated in FIG. 5, it is assumed that the jobs J1, J2, J3, J4, J5, J6, and J7 have already been scheduled. The jobs to be allocated this time are the jobs A, B, C, and D. In this case, the available resource information 132*a* includes the following information.

At the time t0, an available computing resource is not present. At the time t1, two types of computing resources are available. The first one of the computing resources is a time zone from time t1 to time t3–t1 of a single computation node having a computation node ID "6". The second one is a time zone from the time t1 to the non-upper limit of two computation nodes having the computation node IDs "4" and "5".

At the time t2, three types of computing resources are available. The first one of the computing resources is a time zone from time t2 to time t3–t2 of two computation nodes having the computation node IDs "6" and "7". The second one is a time zone from time t2 to time t4–t2 of a single computation node having a computation node ID "3". The third one is a time zone from the time t2 to the non-upper limit of two computation nodes having the computation node IDs "4" and "5".

The available resource information 132a includes similar available computing resource information regarding the times t3, t4, and t5. The allocation target job information 121a includes a pointer indicating job information (subsequent target job information) of the job A as the head job information. A requested resource amount of the job A is "2" and the resource use time of the job A is "tA". The allocation target job information 121a includes the pointer (not illustrated in FIG. 26) indicating information (subsequent target job information) of the job D as the tail job information.

The subsequent target job information 122a includes information of respective jobs. The pieces of information of respective jobs are connected to each other by the pointer in descending order of priority. The subsequent target job information 122a includes information of the jobs B, C, and D. A requested resource amount of the job B is "1" and the resource use time of the job B is "tB". The job B is a job having the highest priority second to that of the job A. A requested resource amount of the job C is "1" and the resource use time of the job C is "tC". The job C is a job having the highest priority second to that of the job B. A requested resource amount of the job D is "1" and the resource use time of the job D is "tD". The job D is a job having the highest priority second to that of the job C.

Figure 27:
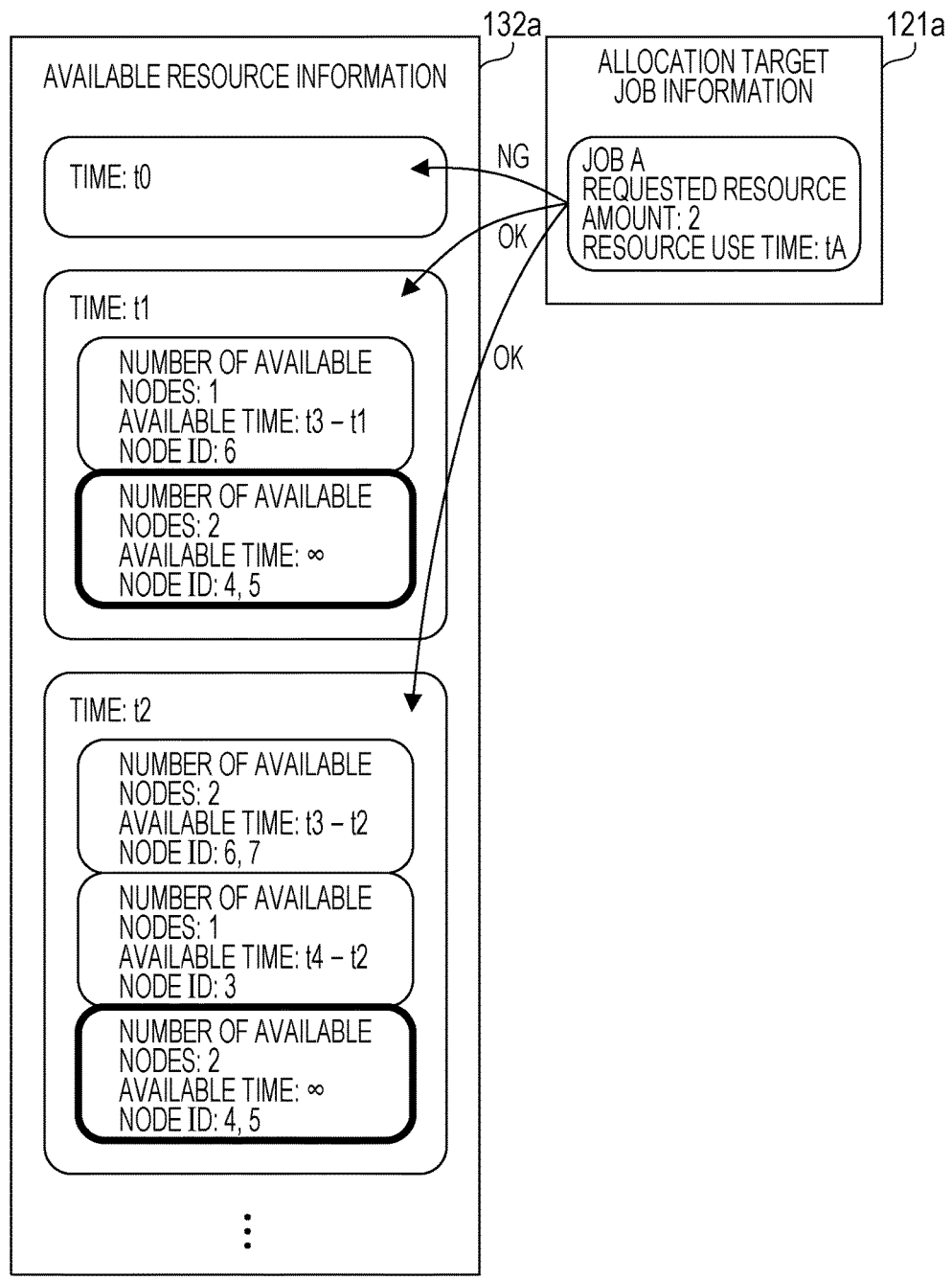
FIG. 27 is a diagram illustrating an example of detecting an allocation candidate time.

FIG. 27 is a diagram illustrating an example of allocation candidate time detection. The allocation candidate time detection unit 181 detects the allocation candidate time using the job A having the highest priority among the jobs A, B, C, and D. For example, since the available computing resource is not present at the time t0, the time t0 is unable to be the allocation candidate time of the job A.

At the time t1, a computing resource of which the number of available nodes is "2" and the available time is unlimited ($\infty$) is present. It is that tA<$\infty$. The computing resource satisfies the requirements that the requested resource amount of the job A is "2" and the resource use time of the job A is "tA". Accordingly, the time t1 is a time allocatable for the job A and is the allocation candidate time.

At the time t2, the computing resource of which the number of available nodes is "2" and the available time is "t3−t2" is present. However, tA>t3−t2. That is, since the computing resource does not satisfy the requirements for the resource use time "tA", the job A is not able to be allocated to the computing resource. At the time t2, the available computing resource of which the number of nodes is "2" and the available time is unlimited is present. The computing resource satisfies the requirements that the requested resource amount of the job A is "2" and the resource use time of the job A is "tA". Accordingly, the time t2 is a time allocatable for the job A and is the allocation candidate time.

As such, the allocation candidate time detection unit 181 sequentially detects the allocation candidate time. The allocation candidate time detection unit 181 does not detect the allocation candidate time by selecting a time in the future as non-limited time. The upper limit is set for the allocation candidate time such that the execution of the job A is not delayed equal to or more than a certain degree and scheduling is efficiently performed.

Figure 28:
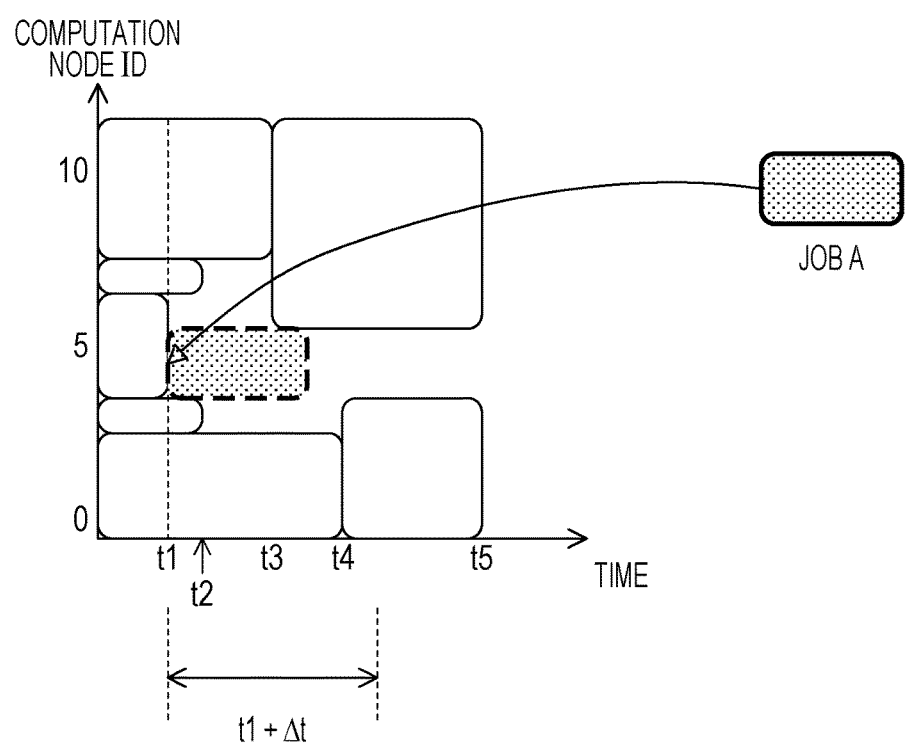
FIG. 28 is a diagram illustrating an example of an upper limit time of allocation candidate time.

FIG. 28 is a diagram illustrating an example of an upper limit of allocation candidate time. The parameter information 151 includes the upper limit $\Delta t$ of allocation candidate time. The allocation candidate time detection unit 181 calculates a time (allocation end time) which becomes the upper limit of the allocation candidate time using the earliest allocation candidate time t1 and $\Delta t$ determined for the job A having the highest priority. Specifically, the time of upper limit of the allocation candidate time is t1+$\Delta t$. In a case of the present example, the time t1+$\Delta t$ is later than the time t4 and earlier than the time t5. For that reason, the allocation candidate time detection unit 181 detects the time t1, the time t2, the time t3, and the time t4 as the allocation candidate times. Since the time t5 is later than the upper limit time t1+$\Delta t$, the time t5 is excluded from the allocation candidate time.

Figure 29:
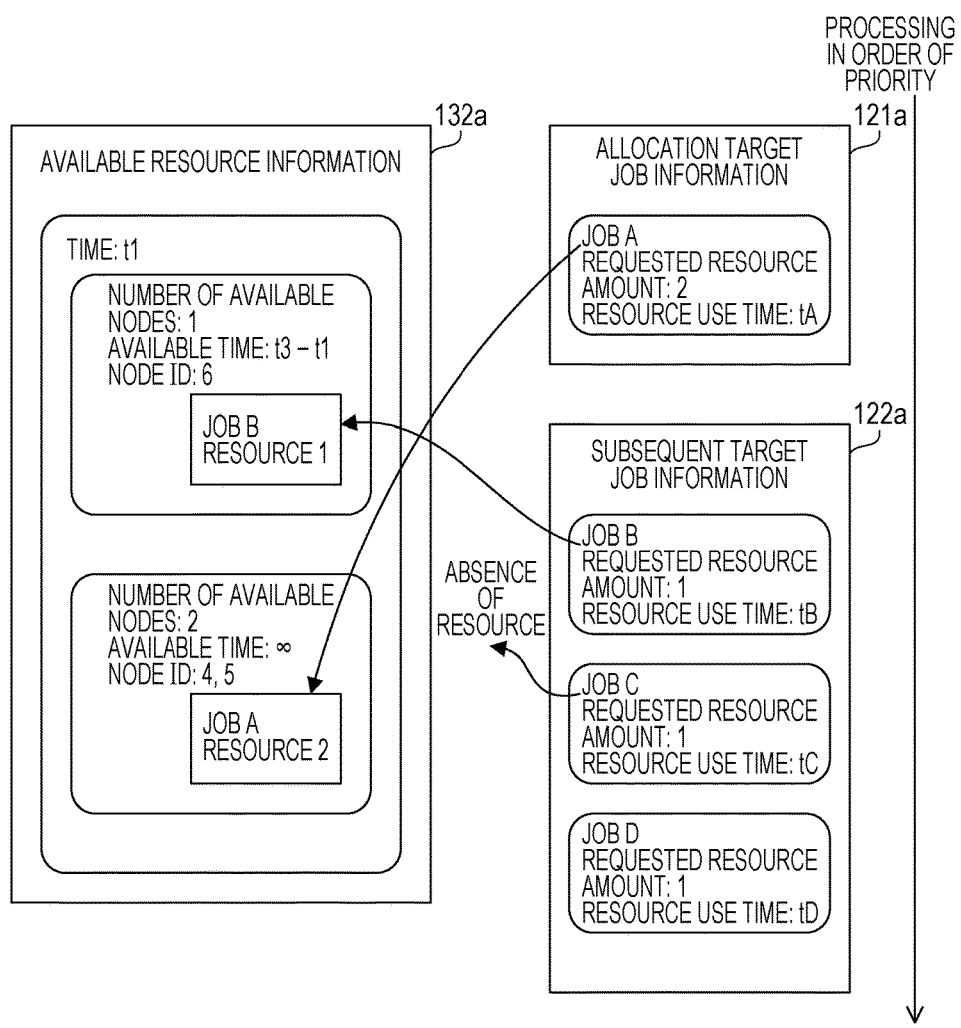
FIG. 29 is a diagram illustrating an example of selecting a temporary allocation target job.

FIG. 29 is a diagram illustrating an example of selecting a temporary allocation target job. The temporary resource allocation unit 182 selects the temporary allocation target job to respective times included in a time range from the allocation candidate time as a start point to the upper limit time (t1+$\Delta t$) from among the jobs A, B, C, and D that are the allocation targets this time by paying attention to a single allocation candidate time. For example, in a case of paying attention to the allocation candidate time t1, the temporary resource allocation unit 182 selects a temporary allocation target job for the time t1 first. The temporary allocation target job is selected according to the order of priority of jobs.

More specifically, the temporary resource allocation unit 182 refers to the resource information for the time t1 in the available resource information 132a to select the temporary allocation target job in order of the jobs A, B, C, and D. First, at the time t1, two computation nodes having the computation node IDs "4" and "5" may be allocated to the job A. For that reason, the job A is the temporary allocation target job at the time t1.

Next, at the time t1, a single computation node having the computation node ID "6" may be allocated to the job B. This is because the resource use time tB of the job B is tB<t3−t1. For that reason, the job B is the temporary allocation target job in the time t1.

In this case, at the time t1, all available computation nodes are selected for the jobs A and B. For that reason, the computation node able to be allocated to the jobs after the job C is not present. Therefore, the jobs C and D do not become temporary allocation target jobs in the time t1.

Figure 30:
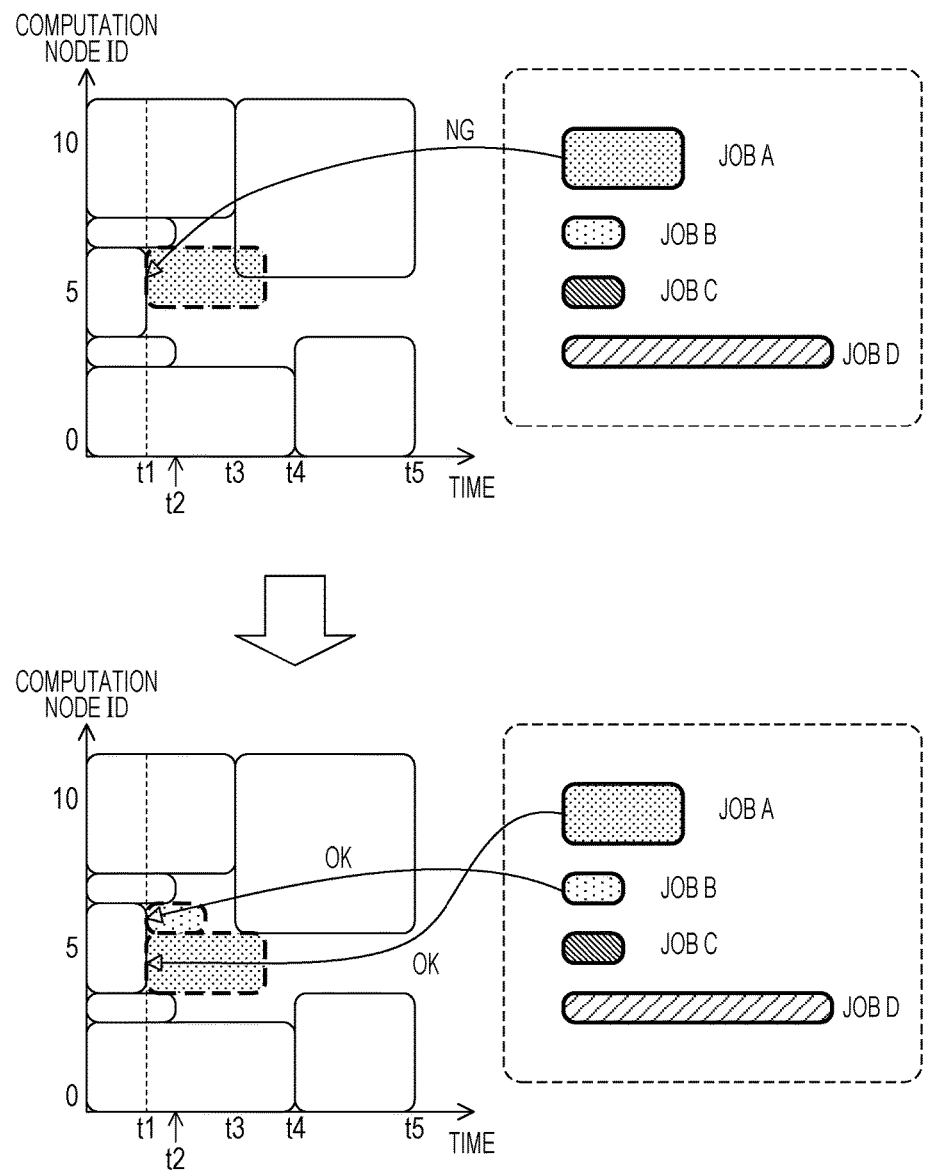
FIG. 30 is a diagram illustrating the (continued) example of selecting the temporary allocation target job.

FIG. 30 is a diagram illustrating the (continued) example of selecting a temporary allocation target job. The processing in FIG. 29 may be described as exemplified in FIG. 30. First, the temporary resource allocation unit 182 determines that the computation nodes having the computation node IDs "4" and "5" are able to be allocated to the job A in the time t1 based on the available resource information 132a. The temporary resource allocation unit 182 determines that the job A is the temporary allocation target job to the time t1.

Next, the temporary resource allocation unit 182 determines that the computation node having the computation node ID "6" is able to be allocated to the job B in the time t1 based on the available resource information 132a. The temporary resource allocation unit 182 determines that the job B is the temporary allocation target job to the time t1.

At this time point, the computation node capable of being allocated to other jobs is not present in the time t1. Therefore, the temporary resource allocation unit 182 does not select the jobs C and D as the temporary allocation target job in the time t1. In this case, the jobs selected as the temporary allocation target job are the jobs A and B. Then, the temporary resource allocation unit 182 executes the temporary allocation of the computing resource of the time t1 to the temporary allocation target jobs A and B.

Figure 31:
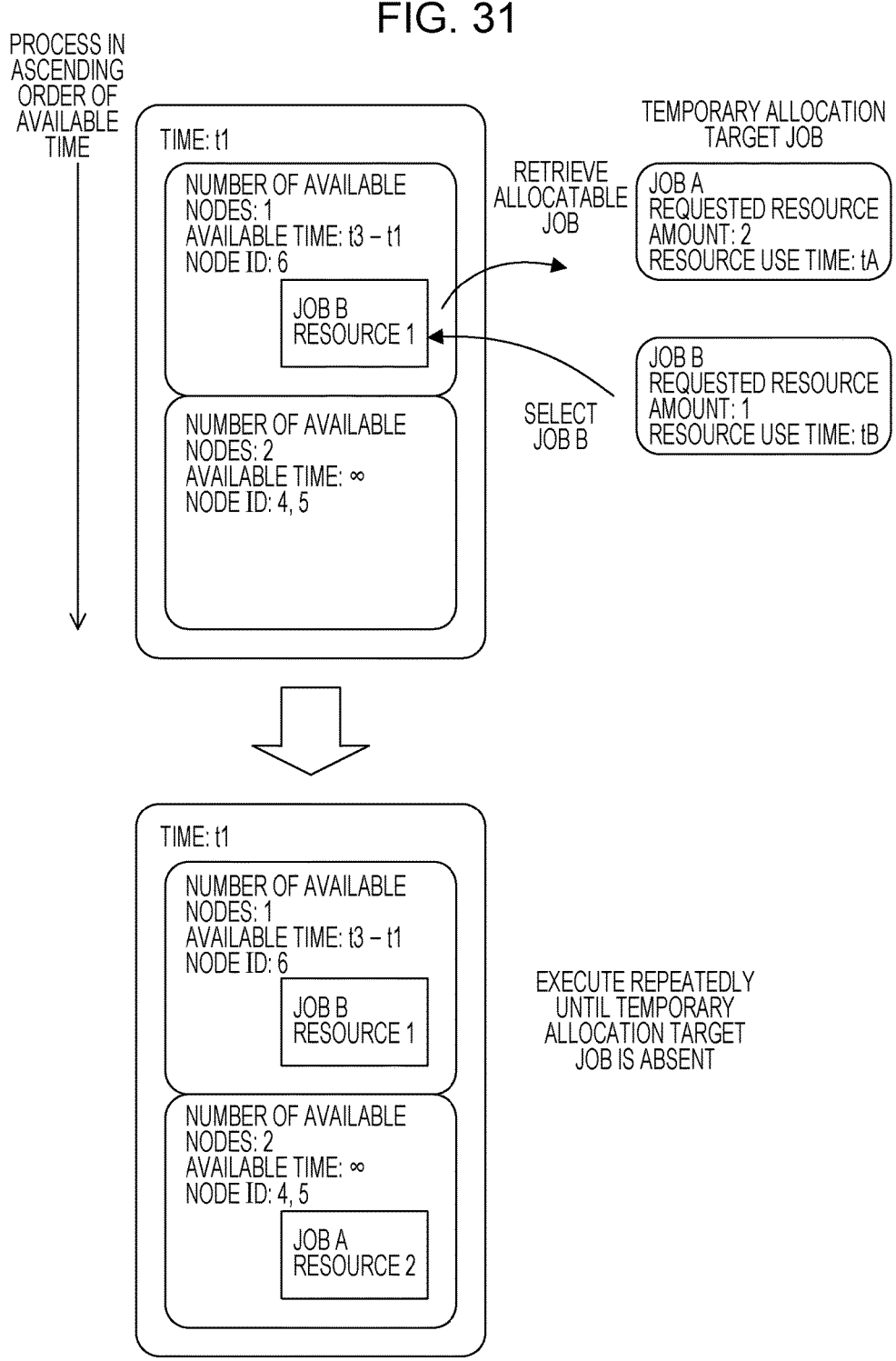
FIG. 31 is a diagram illustrating an example of a temporary allocation.

FIG. 31 is a diagram illustrating an example of temporary allocation. The temporary resource allocation unit 182 searches for the allocatable jobs in ascending order of available time of the available computing resources when performing the temporary allocation processing. Here, the temporary resource allocation unit 182 searches for the job from among the temporary allocation target jobs A and B specified for the time t1. In this case, the temporary resource allocation unit 182 gives preference to a job having a long resource use time over other temporary allocation target jobs among the temporary allocation target jobs.

More specifically, the available resource information 132a includes two types of resource information of the available time t3–t1 and the available time as the computing resource able to be used in the time t1. The temporary resource allocation unit 182 retrieves the job to which a computing resource having a short available time (available time t3–t1) is to be allocated. The job retrieval order is a descending order of the resource use time as described above (since tA>tB, A and B in this order). In this case, the resource use time "tA" of the job A is tA>t3–t1. Accordingly, it is not possible to allocate the job A. Next, the resource use time "tB" of the job B is tB<t3–t1. Accordingly, it is possible to allocate the job B. As such, the temporary resource allocation unit 182 allocates the computation node having the computation node ID "6" to the job B, which is the temporary allocation target job, in the time t1. Next, the temporary resource allocation unit 182 similarly allocates the computation nodes having the computation node IDs "4" and "5" to the job A, which is the temporary allocation target job, in the time t1.

Figure 32:
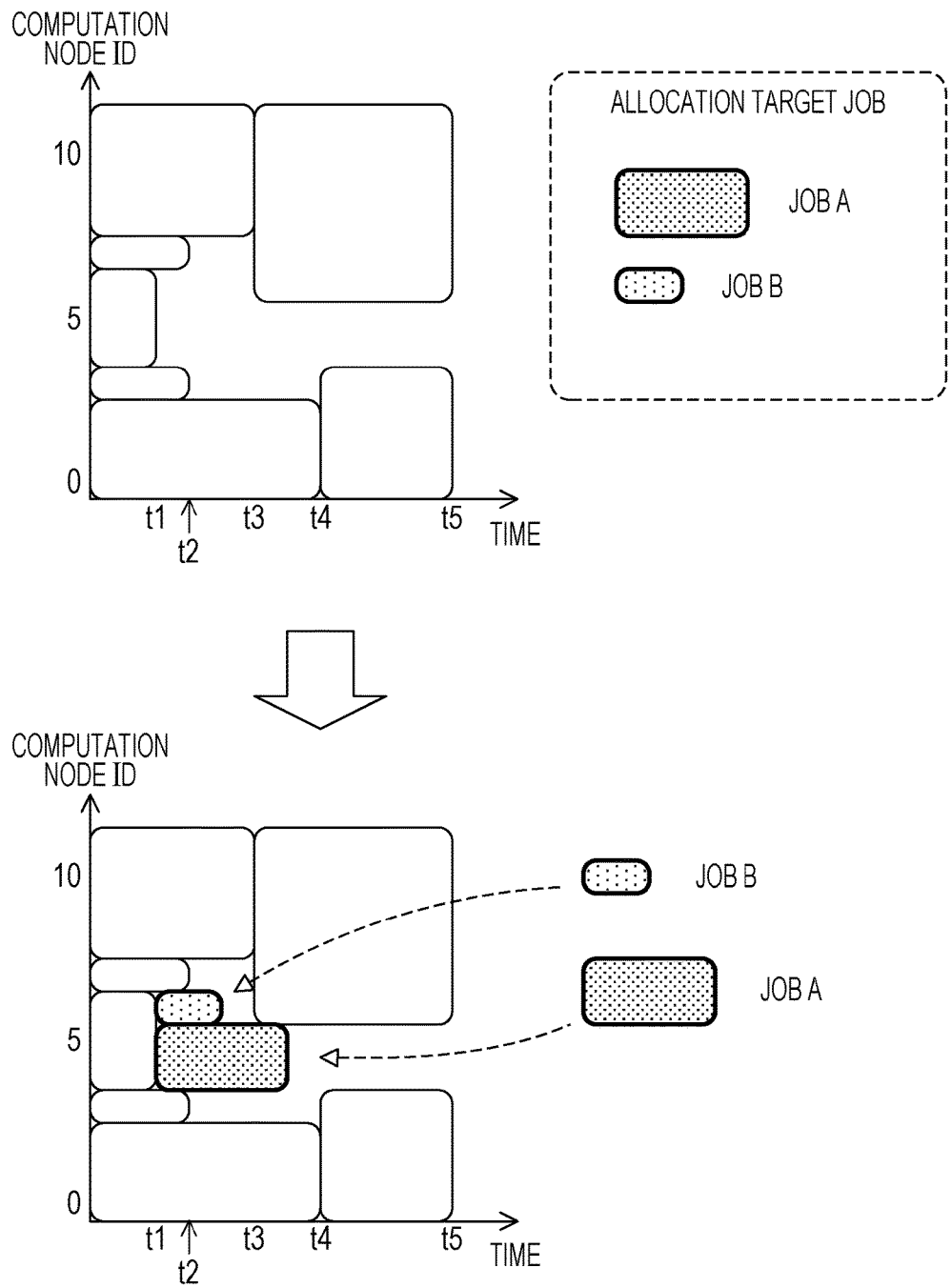
FIG. 32 is a diagram illustrating the example (continued) of a temporary allocation.

FIG. 32 is a diagram illustrating the (continued) example of temporary allocation. The processing in FIG. 31 may be described as exemplified in FIG. 32. First, the temporary resource allocation unit 182 retrieves a job to be allocated at the time t1 to the computation node having the computation node ID "6" from among the temporary allocation target jobs A and B. In the temporary allocation target jobs A and B, the resource use time of the job A is longer than that of the job B (tA>tB). Accordingly, although the temporary resource allocation unit 182 tests for the allocation of the job A to the computation node having the computation node ID "6" in the time t1, the requirements for the job A are not satisfied and thus, it is not possible to allocate the job A. Next, the temporary resource allocation unit 182 tests for the allocation of the job B to the computation node having the computation node ID "6" in the time t1 and determines that the requirements for the job B are satisfied, and allocates the job B to the computation node. Subsequently, the temporary resource allocation unit 182 allocates the job A (job A is only the remaining temporary target job) at the time t1 to the computation node having the computation node IDs "4" and "5".

As such, the temporary resource allocation unit 182 completes the allocation of the computing resources to the temporary allocation target job in the time t1. The temporary resource allocation unit 182 updates the available resource information 132a according to the temporary allocation result.

Figure 33:
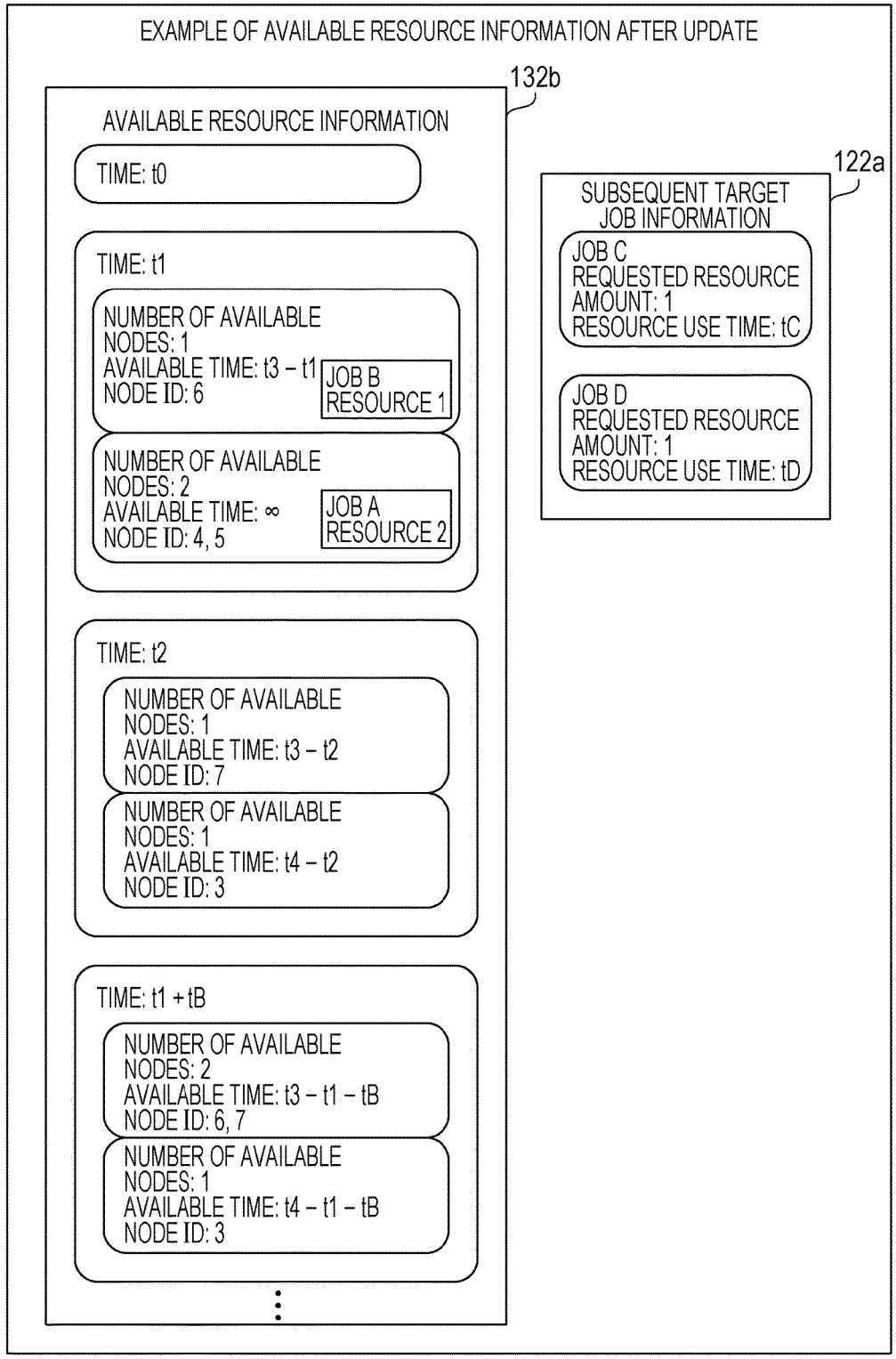
FIG. 33 is a diagram illustrating an example of available resource information after an update.

FIG. 33 is a diagram illustrating an example of available resource information after an update. The temporary resource allocation unit 182 reflects the results obtained by allocating the jobs A and B to the time t1 to the available resource information 132a. Specifically, the temporary resource allocation unit 182 adds the fact that the computation node having the computation node ID "6" among the resource information of the time t1 is allocated to the job B. The temporary resource allocation unit 182 adds the fact that the two computation nodes having the computation node IDs "4" and "5" among the resource information of the time t1 are allocated to the job A.

Furthermore, the temporary resource allocation unit 182 adds information for the time t1+tB to the available resource information 132a (instances of structure 132 and structure 133 included in structure 132 are added). Specifically, in the time t1+tB, the resource information in which the number of available nodes is "2", the available time is "t3–t1–tB", the node IDs are "6" and "7" is added. In the time t1+tB, the resource information in which the number of available nodes is "1", the available time is "t4–t1–tB", the node ID is "3" is added. The available resource information 132b is for exemplifying available resource information after the resource information is added to the available resource information 132a.

Similarly, the temporary resource allocation unit 182 also adds the information for the time t1+tA to the available resource information 132a (but, the added information is not illustrated in FIG. 33).

The temporary resource allocation unit 182 selects the temporary allocation target job for the next time from among the remaining jobs C and D based on the updated available resource information 132b and executes the temporary allocation of the computing resource to the selected job. The temporary resource allocation unit 182 may repeatedly execute the processing described above and obtain the temporary allocation pattern of jobs for each temporary allocation candidate time.

Figure 34A:
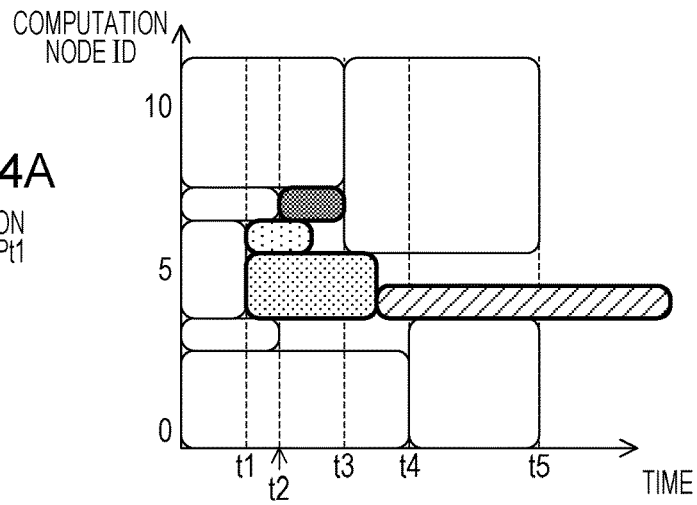
FIG. 34A to FIG. 34C are diagrams illustrating examples of temporary allocation patterns.
Figure 34B:
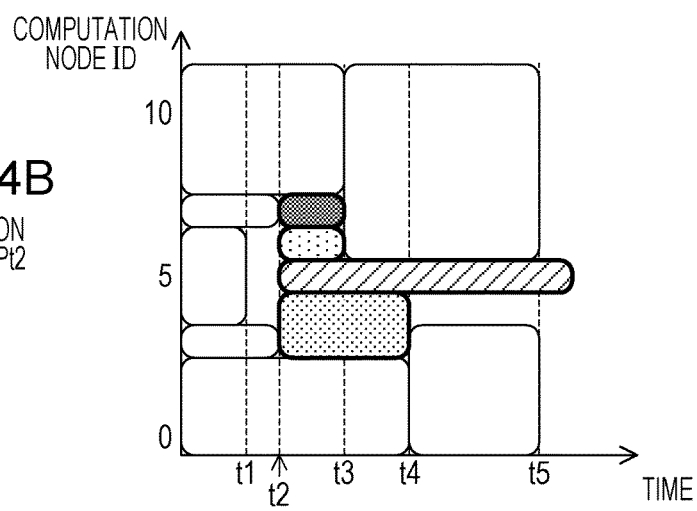
Figure 34C:
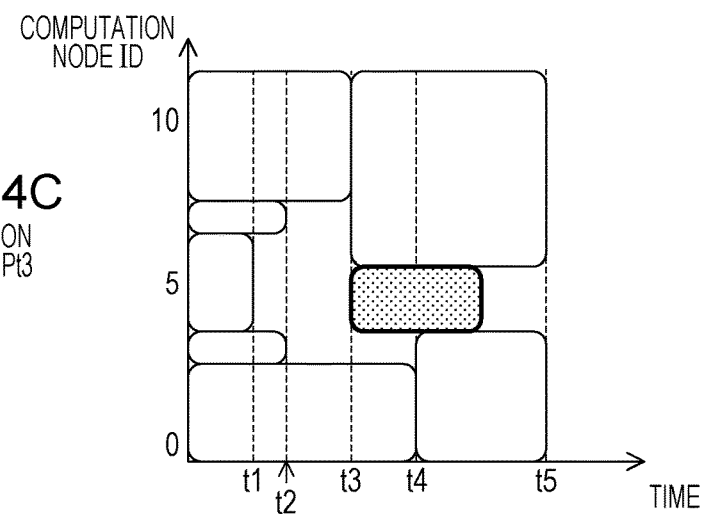

FIG. 34A to FIG. 34C are diagrams illustrating examples of temporary allocation patterns. FIG. 34A illustrates a temporary allocation pattern Pt1 for the allocation candidate time t1. Specifically, the temporary resource allocation unit 182 allocates the computing resource (computation node ID "7") of the time t2 to the job C after finishing the allocation of the computing resource of the time t1 to the jobs A and B by the method illustrated in FIGS. 32 and 33. The temporary resource allocation unit 182 allocates the computing resource (computation node ID "4") of the time t1+tA to the job D. As such, the temporary resource allocation unit 182 obtains the temporary allocation pattern Pt1. The computation node having any one of the computation node ID "4" and the computation node ID "5" among the computing resources of the time t1+tA is allocated to the job D. In a case where the computing resources available for both of the computation node IDs "4" and "5" are identical to each other, the computation node having a smaller computation node ID is preferentially allocated (cases in the following are the same).

FIG. 34B illustrates a temporary allocation pattern Pt2 for the allocation candidate time t2. In a case of the allocation candidate time t2, the temporary resource allocation unit 182 selects the jobs A, B, C, and D as the temporary allocation target jobs in the time t2. The temporary resource allocation unit 182 allocates the computation node having the computation node ID "6" to the job B. The temporary resource allocation unit 182 allocates the computation node having the computation node ID "7" to the job C. The temporary resource allocation unit 182 allocates two computation nodes having the computation node IDs "3" and "4" to the job A. The temporary resource allocation unit 182 allocates the computation node having the computation node ID "5" to the job D.

FIG. 34C illustrates a temporary allocation pattern Pt3 for the allocation candidate time t3. In a case of the allocation candidate time t3, the temporary resource allocation unit 182 selects the job A as the temporary allocation target job in the time t3. The temporary resource allocation unit 182 allocates two computation nodes having the computation node IDs "4" and "5" to the job A. In the time t3, the computation nodes having the computation node ID "3" are also available but the time t4−t3 is shorter than the resource available time tB of the job B (tB<t4−t3) and thus, the jobs other than the job A are not able to be allocated in the time t3. Furthermore, the time t3+tA is a time later than the time t1+Δt. Therefore, the temporary resource allocation unit 182 does not perform the temporary allocation of jobs other than the job A (jobs other than the job A are not placed in the temporary allocation pattern Pt3).

Regarding the allocation candidate time t4, the temporary allocation pattern is similarly prepared. The temporary allocation pattern for the allocation candidate time t4 becomes a pattern in which the job A is placed using the allocation candidate time t4 as the start point (not illustrated in the figure). Since the time t4+tA is also a time later than the time t1+Δt, the temporary allocation of jobs other than the job A is not performed similar to the case of the allocation candidate time t3 (jobs other than the job A are not placed in the temporary allocation pattern for the allocation candidate time t4).

Figure 35:
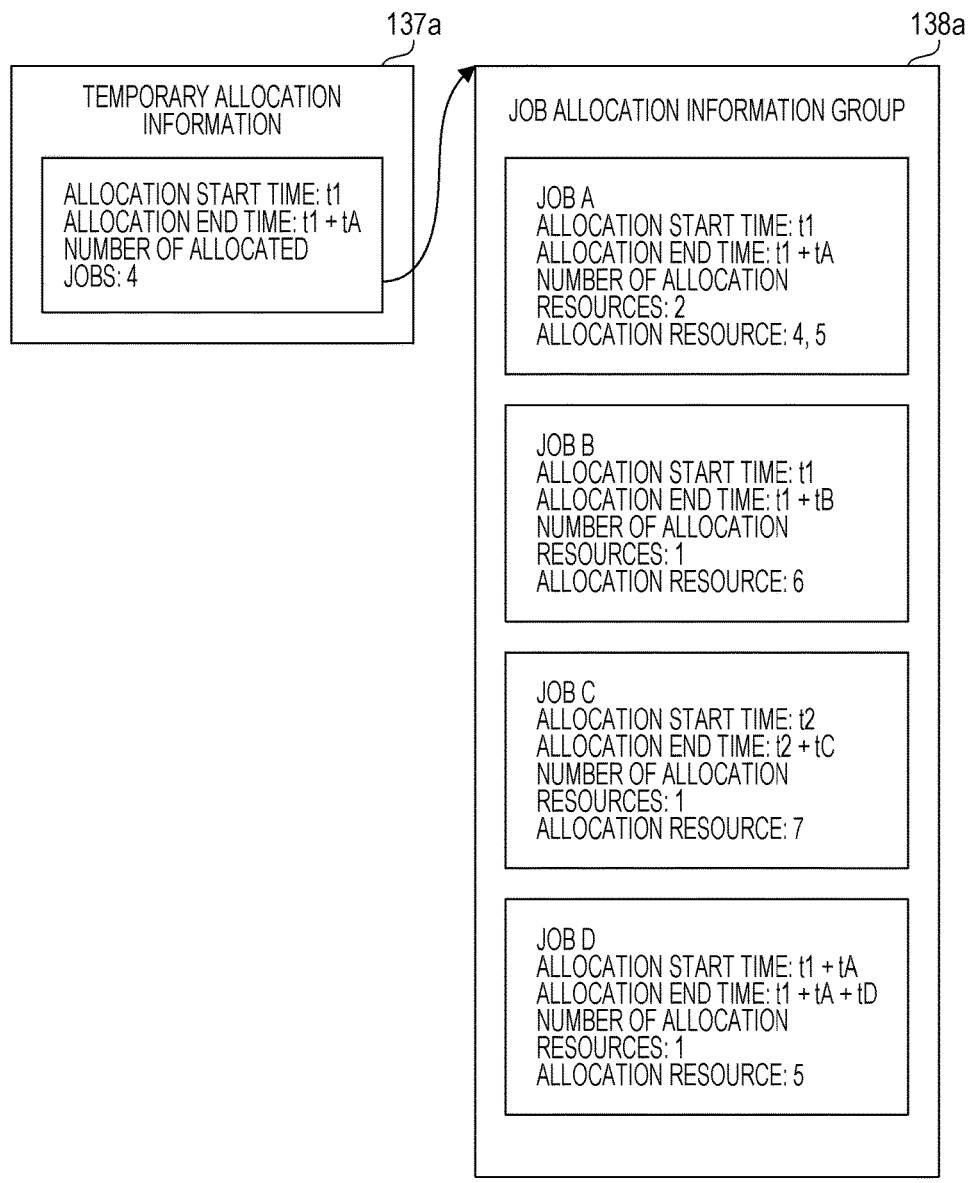
FIG. 35 is a diagram illustrating an example of temporary allocation information.

FIG. 35 is a diagram illustrating an example of temporary allocation information (pattern Pt1). The temporary allocation information 137a and the job allocation information group 138a are specific examples of information illustrating the temporary allocation pattern Pt1.

The temporary allocation information 137a includes the following information. The allocation start time is "t1". The allocation end time is "t1+tA" (corresponding to a time at which execution of the last job D is started). The number of allocated jobs is "4". This is because a result of the temporary allocation is performed for a total of four jobs of the jobs A, B, C, and D. The temporary allocation information 137a includes a pointer indicating information of the head job allocation (information of the job A) of the job allocation information group 138a. The job allocation information group 138a includes the allocation information about each of the jobs A, B, C, and D. The pieces of allocation information of respective jobs are connected to each other by the pointer in order of priority.

The allocation information about the job A includes the following information. The allocation start time is "t1". The allocation end time is "t1+tA". The number of allocated jobs is "2". The allocated resources (computation node IDs) are "4" and "5".

The allocation information about the job B includes the following information. The allocation start time is "t1". The allocation end time is "t1+tB". The number of allocated jobs is "1". The allocated resource (computation node IDs) is "6".

The allocation information about the job C includes the following information. The allocation start time is "t2". The allocation end time is "t2+tC". The number of allocated jobs is "1". The allocated resource (computation node IDs) is "7".

The allocation information about the job D includes the following information. The allocation start time is "t1+tA". The allocation end time is "t1+tA+tD". The number of allocated jobs is "1". The allocated resource (computation node IDs) is "5".

Figure 36:
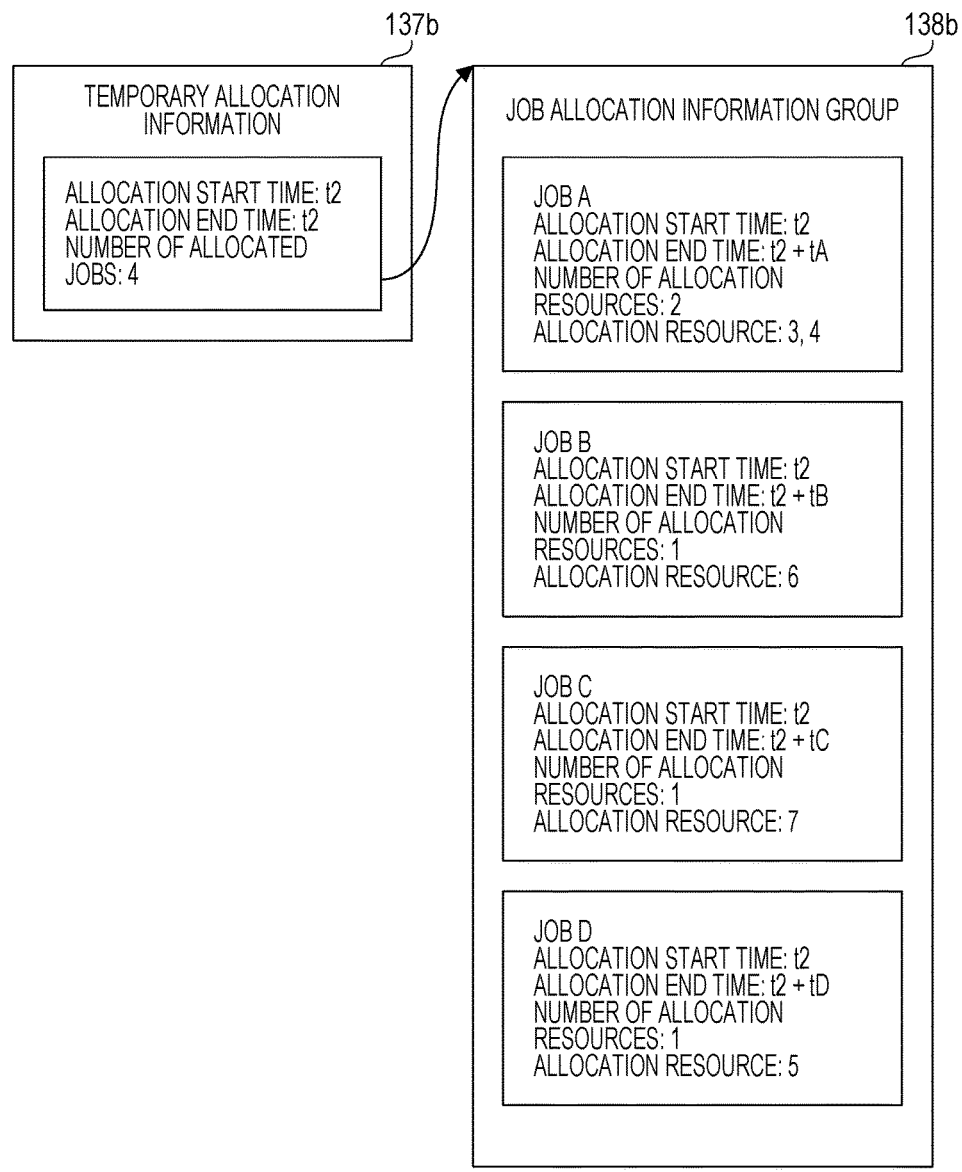
FIG. 36 is a diagram illustrating an example of temporary allocation information.

FIG. 36 is a diagram illustrating an example of temporary allocation information (pattern Pt2). The temporary allocation information 137b and the job allocation information group 138b are specific examples of information illustrating the temporary allocation pattern Pt2.

The temporary allocation information 137b includes the following information. The allocation start time is "t2". The allocation end time is "t2". In a case of the temporary allocation pattern Pt2, all of the jobs A, B, C, and D are allocated to the time t2 and thus both the allocation start time and the allocation end time become "t2". The number of allocated jobs is "4". This is a result of the temporary allocation is performed for a total of four jobs of the jobs A, B, C, and D. The temporary allocation information 137b includes a pointer indicating information of the head job allocation (information of the job A) of the job allocation information group 138b. The job allocation information group 138b includes the job allocation information about each of the jobs A, B, C, and D. Pieces of the allocation information of respective jobs are connected to each other by the pointer in order of priority.

The allocation information about the job A includes the following information. The allocation start time is "t2". The allocation end time is "t2+tA". The number of allocated jobs is "2". The allocated resources (computation node IDs) are "3" and "4".

The allocation information about the job B includes the following information. The allocation start time is "t2". The allocation end time is "t2+tB". The number of allocated jobs is "1". The allocated resource (computation node IDs) is "6".

The allocation information about the job C includes the following information. The allocation start time is "t2". The allocation end time is "t2+tC". The number of allocated jobs is "1". The allocated resource (computation node IDs) is "7".

The allocation information about the job D includes the following information. The allocation start time is "t2". The allocation end time is "t2+tD". The number of allocated jobs is "1". The allocated resource (computation node IDs) is "5".

The temporary allocation pattern for each of the allocation candidate times t3 and t4 is also managed similar to the temporary allocation patterns Pt1 and Pt2. The allocation resource selection unit 183 may compare information of the respective temporary allocation patterns with each other such that the number of jobs within a predetermined time range, the execution completion time, a ratio of an amount of free time in a computation node and the like in respective temporary allocation patterns are able to be compared.

The allocation resource selection unit 183 selects the temporary allocation patterns which have a reference over all other temporary allocation patterns from among the plurality of temporary allocation patterns based on the information of allocation adoption criteria included in the parameter information 151. For example, the number of temporary allocation jobs is "1" in the allocation candidate times t3 and t4 while the number of temporary allocation jobs is "4" in the allocation candidate times t1 and t2 when seen from the viewpoint of the criteria that the number of temporary allocation jobs is large. For that reason, the two temporary allocation patterns for the allocation candidate times t3 and t4 have the priority lower than those of the temporary allocation patterns Pt1 and Pt2 in the allocation candidate times t1 and t2. Accordingly, the allocation resource selection unit 183 excludes the two temporary allocation patterns for the allocation candidate times t3 and t4 from the candidates for selection.

Next, the allocation resource selection unit 183 compares the temporary allocation patterns Pt1 and Pt2 with each other according to the allocation adoption criteria. The temporary allocation patterns Pt1 and Pt2 have the same number of temporary allocation jobs of "4". For that reason, the allocation resource selection unit 183 selects any one of the temporary allocation patterns Pt1 and Pt2 according to the criteria that the execution of each job is completed quickly. Here, the time at which all of the jobs A, B, C, and D in the temporary allocation pattern Pt2 are completed is earlier than in the temporary allocation pattern Pt1.

Specifically, the job of which execution is completed last is the job D for any of the temporary allocation patterns Pt1 and Pt2. According to the job allocation information group 138a, the allocation end time of the job D is "t1+tA+tD" in the temporary allocation pattern Pt1. According to the job allocation information group 138b, the allocation end time of the job D is "t2+tD" in the temporary allocation pattern Pt2. The time t2+tD is a time earlier than the time t1+tA+tD. Therefore, the allocation resource selection unit 183 determines that the temporary allocation pattern Pt2 has a priority higher than that of the temporary allocation pattern Pt1.

Finally, the allocation resource selection unit 183 adopts the temporary allocation pattern Pt2 as the allocation of computing resources for the jobs A, B, C, and D. The allocation resource selection unit 183 reflects the contents of the selected temporary allocation pattern Pt2 in the execution waiting job information 141. The jobs A, B, C, and D are able to be executed by the plurality of computation nodes according to the schedule corresponding to the selected temporary allocation pattern Pt2.

According to the management node 100, it is possible to achieve efficient job execution. For example, it is considered that the jobs are sequentially executed according to the priority at the earliest time at which respective jobs assigned the priority are able to be executed. However, simply allocating the jobs to the earliest time according to the priority is that computing resources are not necessarily allocated to respective jobs. The time taken to complete all jobs may become longer.

The management node 100 also takes into account the jobs B, C, and D when scheduling the job A having the having the highest priority. Specifically, the management node 100 acquires a plurality of temporary allocation patterns that become the scheduling candidates for the jobs A, B, C, and D and compares the plurality of temporary allocation patterns with each other to adopt the pattern in which more jobs are able to be executed within a predetermined period of time according to the parameter information 151. The management node 100 performs allocation of respective jobs to respective computation nodes according to the adopted temporary allocation pattern. For example, a time until the execution of all of the jobs A, B, C, and D is completed in the temporary allocation pattern Pt2 may be made earlier than in the temporary allocation pattern Pt1. It is possible to decrease the amount of free time of the computation node in the temporary allocation pattern Pt2 more than in the temporary allocation pattern Pt1. For that reason, it is possible to enhance the scheduling for job execution while maintaining the job priority. As such, it is possible to achieve efficient job execution.

In the information processing according to the first embodiment, it is possible to realize that the operation unit 1b causes a program to be executed. In the information processing according to the second embodiment, it is possible to realize that the CPUs 101 and 102 cause the program to be executed. The program may be recorded in a computer readable recording medium 13.

For example, the recording medium 13 having the program recorded therein may be distributed such that the program is circulated. When the program is stored in another computer, the program may be distributed through a network. The computer may store (install), for example, a program stored in the recording medium 13 or a program received from another computer in a storage device such as the RAM 103, the HDD 104, or the like, and read the program from the storage device, and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a memory configured to store information of time zones available for each of a plurality of computation nodes; and
    a processor coupled to the memory and configured to execute a process, the process comprising:
        obtaining, based on the information, a first time at which a job having the highest priority among a plurality of jobs is able to be executed, and
        in a case where a second time, which is later than the first time and is a candidate for an execution start time of the job having the highest priority, and from which more jobs, including the job having the highest priority, are able to be executed in a predetermined time range than a case of executing the job having the highest priority from the first time, is present, allocating the plurality of jobs to the plurality of computation nodes such that the job having the highest priority and one or more other jobs are executed from the second time.

2. The information processing apparatus according to claim 1,
    wherein the process further comprises,
        generating information indicating a candidate for an allocation pattern of the plurality of jobs to the plurality of computation nodes in a case where an execution of the job having the highest priority is started at each of the first time and the second time, and
        selecting either the job having the highest priority is to be executed at the first time or the second time according to a comparison of the candidate for the allocation pattern.

3. The information processing apparatus according to claim 2, wherein
    the selecting comprises comparing the time at which the execution of all of the plurality of jobs is completed based on the candidate for the allocation pattern, and selecting the time at which the job having the highest priority is to be executed according to the comparison.

4. The information processing apparatus according to claim 2, wherein
    the selecting comprises comparing an amount of free time of the plurality of computation nodes based on the candidate for the allocation pattern, and selecting the time at which the job having the highest priority is to be executed according to the comparison.

5. The information processing apparatus according to claim 2, wherein
    the selecting comprises generating information indicating candidates for the allocation pattern of the plurality of jobs to the plurality of computation nodes in a case where the execution of the job having the highest priority is started at each of a plurality of candidate times that are candidates for the second time, and selecting a time at which the job having the highest priority is to be executed according to the comparison of the candidate times for the allocation patterns.

6. The information processing apparatus according to claim 5,
wherein the first time is the earliest time at which the job having the highest priority is able to be executed, and an upper limit time of the plurality of candidate times is determined based on the first time.

7. The information processing apparatus according to claim 1,
wherein the memory is configured to store information of requested resources indicating the number of computation nodes and use time of the computation nodes for execution of each of the plurality of jobs, and
in the obtaining, the first time and the second time is specified based on the time zones available for the plurality of computation nodes and the requested resources of each of the plurality of jobs.

8. A parallel computer system comprising:
a plurality of computation nodes to which a plurality of jobs are able to be allocated; and
a management node configured to, based on information of a time zone available for the plurality of computation nodes, obtain a first time at which a job having the highest priority among a plurality of jobs is able to be executed and in a case where a second time, which is later than the first time and is a candidate for an execution start time of the job having the highest priority and from which more jobs, including the job having the highest priority, are able to be executed in a predetermined time range than a case of executing the job having the highest priority from the first time, is present, allocate the plurality of jobs to the plurality of computation nodes such that the job having the highest priority and other jobs are executed from the second time.

9. A job schedule setting program, stored in a non-transitory and computer-readable medium, for causing a computer to execute a process, the process comprising:
based on information of a time range at which a time zone available for the plurality of computation nodes, obtaining a first time at which a job having the highest priority among a plurality of jobs is able to be executed; and
in a case where a second time, which is later than the first time, is a candidate for an execution start time of the job having the highest priority, and from which more jobs, including the job having the highest priority, are able to be executed in a predetermined time range than a case of executing the job having the highest priority from the first time, is present, allocating the plurality of jobs to the plurality of computation nodes such that the job having the highest priority and other jobs are executed from the second time.

* * * * *